US 8,401,747 B2

(12) United States Patent
Ito

(10) Patent No.: US 8,401,747 B2
(45) Date of Patent: Mar. 19, 2013

(54) SHIFT-BY-WIRE DEVICE AND TRANSMISSION DEVICE MOUNTING THEREON THE SAME

(75) Inventor: Yoshinobu Ito, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 551 days.

(21) Appl. No.: 12/637,142

(22) Filed: Dec. 14, 2009

(65) Prior Publication Data
US 2010/0161187 A1 Jun. 24, 2010

(30) Foreign Application Priority Data

Dec. 19, 2008 (JP) .................................. 2008-324188
Feb. 27, 2009 (JP) .................................. 2009-045728

(51) Int. Cl.
*F16H 61/02* (2006.01)
*F16H 61/12* (2010.01)
*F16H 61/28* (2006.01)
*G06F 19/00* (2011.01)

(52) U.S. Cl. ................................ 701/51; 701/58; 701/62

(58) Field of Classification Search .............. 477/906–7; 74/335; 250/231.14; 701/51–66
See application file for complete search history.

(56) References Cited

U.S. PATENT DOCUMENTS

| 5,052,247 A * | 10/1991 | Kato et al. ........................ 477/49 |
| 5,094,115 A * | 3/1992 | Michihira et al. ............... 74/335 |
| 6,139,468 A * | 10/2000 | Goates et al. .................... 477/97 |
| 7,349,770 B2 * | 3/2008 | Matsuzaki et al. ................ 701/1 |
| 7,630,807 B2 * | 12/2009 | Yoshimura et al. ............. 701/48 |
| 2008/0051250 A1 * | 2/2008 | Inoue ............................... 477/34 |
| 2008/0113848 A1 | 5/2008 | Inoue et al. |

FOREIGN PATENT DOCUMENTS

| JP | 2006-335157 A | 12/2006 |
| JP | 2006-336717 A | 12/2006 |
| JP | 2008-133931 A | 6/2008 |
| JP | 2008-240863 A | 10/2008 |

OTHER PUBLICATIONS

Extended European Search Report for corresponding EP Patent Application No. EP 09833279.4 dated Mar. 5, 2012.

* cited by examiner

Primary Examiner — Khoi Tran
Assistant Examiner — Dale Moyer
(74) Attorney, Agent, or Firm — Sughrue Mion, PLLC

(57) ABSTRACT

A shift-by-wire device including a shaft position sensor that detects a shaft rotating angle, a drive unit that drives an actuator of the shaft, an operational function unit including an operational CPU that receives the shaft rotating angle from the shaft position sensor, receives a shift command from an administrative electronic control unit to transmit the shaft rotating angle of the shaft to the administrative electronic control unit, and controls the drive unit according to the shaft rotating angle and shift command. The device further includes a monitoring function unit including a monitoring CPU that receives the shaft rotating angle in order to monitor whether there is an abnormality in the operational function unit and transmits the shaft rotating angle to the administrative electronic control unit when a detected abnormality occurs in the operational function unit.

14 Claims, 16 Drawing Sheets

FIG.2

|  |  | C-1 | C-2 | C-3 | B-1 | B-2 | F-1 | SLC1 | SLC2 | SLC3 | SLB1 | S1 | S2 |
|---|---|---|---|---|---|---|---|---|---|---|---|---|---|
| P |  |  |  |  |  |  |  |  |  | ○ |  | ○ |  |
| REV |  |  |  | ○ |  | ○ |  |  |  |  |  | ○ |  |
| N |  |  |  |  |  |  |  |  |  | ○ |  | ○ | ○ |
| D | 1st | ○ |  |  |  | (○) | ○ | ○ | ○ | ○ |  |  | ○ |
| D | 2nd | ○ |  |  | ○ |  |  | ○ |  | ○ | ○ | ○ |  |
| D | 3rd | ○ |  | ○ |  |  |  | ○ |  |  |  | ○ |  |
| D | 4th | ○ | ○ |  |  |  |  | ○ | ○ | ○ |  | ○ |  |
| D | 5th |  | ○ | ○ |  |  |  |  | ○ |  |  | ○ |  |
| D | 6th |  | ○ |  | ○ |  |  |  | ○ | ○ | ○ | ○ |  |

WHEN SP=P

WHEN SP≠P

US 8,401,747 B2

SHIFT-BY-WIRE DEVICE AND TRANSMISSION DEVICE MOUNTING THEREON THE SAME

INCORPORATION BY REFERENCE

This application claims priority from Japanese Patent Application Nos. 2008-324188, filed on Dec. 19, 2008 and 2009-045728, filed on Feb. 27, 2009, the disclosures of which, including the specifications, drawings and abstracts, are incorporated herein by reference in their entirety.

BACKGROUND OF THE INVENTION

1. Field of the Invention

The present invention relates to a shift-by-wire device and a transmission device mounting thereon the same, and more particular, to a shift-by-wire device connected communicatively to an administrative electronic control unit, which inputs thereinto a signal from a shift position sensor for detection of a demanded shift position demanded by a driver, to drivingly control a manual shaft on the basis of a shift command from the administrative electronic control unit to actuate an object being actuated, an automatic transmission, and a transmission device mounting thereon the shift-by-wire device.

2. Description of the Related Art

Conventionally, there has been proposed, as a transmission device of this type, one mounted on a vehicle and comprising a shift-by-wire system including two by-wire ECUs that drivingly controls a manual valve of a hydraulic circuit, and an automatic transmission control system including an automatic transmission ECU (see, for example, JP-A-2006-335157 (Patent Document 1)). With the device, the shift-by-wire system is provided with two drive units that individually generate torque on an electric motor for driving of the manual valve, the two by-wire ECUs are connected electrically to each other through the two drive units and a switching device, the automatic transmission control system monitors the two by-wire ECUs of the shift-by-wire system, and abnormality in the by-wire ECUs is coped with by switching the switching device so that when abnormality occurs in one of the two by-wire ECUs, the manual valve is drivingly controlled by the other of the two by-wire ECUs, which is normal.

With the transmission device, while the other of the two by-wire ECUs, which is normal, can drivingly control the manual valve even when abnormality occurs in one of the two by-wire ECUs, the device is made large in size and complex because of the need of arranging a surplus ECU, which is used only at the time of abnormality and providing the switching device that switches the driving ECU out of the two by-wire ECUs. In particular, the problem described above becomes further conspicuous since a transmission device is limited in a space for arrangement of an ECU by virtue of being mounted on a vehicle.

SUMMARY OF THE INVENTION

A shift-by-wire device and a transmission device mounting thereon the same in the invention are mainly intended for appropriately coping with abnormality in respect of a control device that drivingly controls a manual shaft for actuation of an object being actuated, without the provision of any surplus control device.

A shift-by-wire device and a transmission device mounting thereon the same in the invention adopt the following mechanism in order to attain the main object described above.

The gist of a shift-by-wire device according to the invention resides in the shift-by-wire device being connected communicatively to an administrative electronic control unit, which inputs thereinto a signal from a shift position sensor for detection of a demanded shift position demanded by a driver, to drivingly control a manual shaft on the basis of a shift command from the administrative electronic control unit to actuate an object being actuated and comprising a shaft position sensor that detects a rotating angle of the manual shaft, a drive unit that drives an actuator of the manual shaft, an operational function unit including an operational CPU that inputs thereinto a rotating angle of the shaft from the shaft position sensor, receives a shift command from the administrative electronic control unit to transmit the rotating angle of the shaft thus input to the administrative electronic control unit, and controls the drive unit on the basis of the rotating angle of the shaft thus input and the shift command thus received, and a monitoring function unit including a monitoring CPU that inputs thereinto a rotating angle of the shaft from the shaft position sensor to monitor the presence of abnormality in the operational function unit and transmits the rotating angle of the shaft thus input to the administrative electronic control unit when it is determined that abnormality occurs in the operational function unit.

With the shift-by-wire device according to the invention, since there are provided an operational function unit including an operational CPU that inputs thereinto a rotating angle of the shaft from the shaft position sensor, receives a shift command from the administrative electronic control unit to transmit the rotating angle of the shaft thus input to the administrative electronic control unit, and controls the drive unit which drives an actuator of a manual shaft on the basis of the rotating angle of the shaft thus input and the shift command thus received, and a monitoring function unit including a monitoring CPU that inputs thereinto a rotating angle of the shaft from the shaft position sensor to monitor the presence of abnormality in the operational function unit and transmits the rotating angle of the shaft thus input to the administrative electronic control unit when it is determined that abnormality occurs in the operational function unit, the administrative electronic control unit can receive a rotating angle of the shaft from the shaft position sensor irrespective of the presence of abnormality in the operational function unit, so that it is possible to cope appropriately with abnormality. Also, as compared with an arrangement, in which an actuator for driving of a manual shaft and ECU for control thereof comprises a dual system, it is possible to make a device further compact. Hereupon, "abnormality in the operational function unit" includes abnormality in an operational CPU and abnormality in communication with the administrative electronic control unit.

With the shift-by-wire device according to the invention, it is possible that the operational function unit and the monitoring function unit are ones, which actuate using different electric sources, and the monitoring function unit is one, which monitors the presence of abnormality in that electric source, from which electricity is supplied to the operational function unit. By doing so, it is possible to cope with abnormality in the electric sources. With the shift-by-wire device of the embodiment according to the invention, it is possible that the actuator of the manual shaft comprises an electric motor having a rotor, a rotational position sensor is provided to detect a rotational position of the rotor in order to control the electric motor, the shaft position sensor comprises a sensor that receives electricity from the electric source for the operational CPU to actuate, the rotational position sensor comprises a sensor that receives electricity from the electric source for the monitoring CPU to actuate, the operational function unit is one that inputs thereinto a rotational position of the rotor from the rotational position sensor and controls the drive unit on the basis of the rotational position thus input, and when it is determined that abnormality occurs in the electric source for supplying electricity to the operational function unit, the monitoring function unit inputs thereinto a rotational position of the rotor from the rotational position sensor and deduces a rotating angle of the shaft on the basis of the rotational position thus input to transmit the same to the administrative electronic control unit. By doing so, it is possible to transmit a rotating angle of the manual shaft to the administrative electronic control unit even in the case where abnormality occurs in the electric source for the operational CPU and the shaft position sensor does not actuate.

Also, with the shift-by-wire device according to the invention, it is possible that the monitoring function unit is one, by which when abnormality is determined by monitoring, results of the determination is transmitted to the administrative electronic control unit. By doing so, the administrative electronic control unit can cope informing a driver of the matter that abnormality occurs in the shift-by-wire device.

Further, with the shift-by-wire device according to the invention, it is possible that the monitoring function unit is one capable of enabling and inhibiting transmission of a drive signal to the drive unit from the operational function unit. By doing so, it is possible to surely prevent malfunctioning of the operational function unit. With the shift-by-wire device of the embodiment according to the invention, it is also possible that the monitoring function unit is one enabling transmission of a drive signal to the drive unit when it is determined that abnormality does not occur in the operational function unit, and inhibiting transmission of a drive signal to the drive unit when it is determined that abnormality occurs in the operational function unit. Further, with the shift-by-wire device of the embodiment according to the invention, it is also possible that the monitoring function unit inputs thereinto a shift command from the administrative electronic control unit to inhibit transmission of a drive signal to the drive unit when a direction of rotation of the manual shaft is different from a direction of rotation conformed to the shift command thus input when the actuator drives the manual shaft, and it is also possible that the monitoring function unit inputs thereinto a shift command from the administrative electronic control unit to inhibit transmission of a drive signal to the drive unit when a rotating angle of the manual shaft exceeds a rotating angle conformed to the shift command thus input when the actuator drives the manual shaft. By doing so, it is possible to cope with abnormality in the operational function unit even when the manual shaft is being driven by a drive signal of the operational function unit. Also, with the shift-by-wire device of these embodiments according to the invention, it is also possible that there is provided a signal transmission cutoff circuit that transmits a drive signal to the drive unit when an enabling signal is input from the monitoring function unit, and shuts off transmission of a drive signal to the drive unit when the enabling signal is not input, the monitoring function unit is one that outputs an OFF signal as the enabling signal through an inverting circuit, and the operational function unit is one that determines whether a predetermined abnormality occurs in the monitoring function unit, and resets the monitoring function unit when it is determined that the predetermined abnormality occurs in the monitoring function unit. By doing so, it is possible to drive the manual shaft even when an enabling signal is not output due to a predetermined abnormality in the monitoring function unit. Hereupon, resetting of the monitoring function unit also includes the case where it is performed by the administrative electronic control unit by virtue of instructions being given to the administrative electronic control unit by the operational function unit, in addition to the case where it is performed directly by the operational function unit. With the shift-by-wire device of the embodiment according to the invention, it is also possible that the operational function unit is one that resets the monitoring function unit when an enabling signal is not output from the monitoring function unit over a predetermined period of time in the case where it is not determined that the predetermined abnormality occurs in the monitoring function unit. By doing so, it is possible to cope with occurrence of some abnormality in the monitoring function unit except the predetermined abnormality.

Also, with the shift-by-wire device according to the invention, it is possible that the drive unit, the operational function unit, and the monitoring function unit are characterized by comprising a single electronic control unit. By doing so, it is possible to make a device further compact.

Also, with the shift-by-wire device according to the invention, it is possible that the object being actuated comprises a parking lock mechanism that operates as the manual shaft is driven.

The gist of a transmission device according to the invention resides in mounting thereon an automatic transmission capable of power transmission by a clutch that makes use of fluid pressure supplied through a manual valve interlocking with a manual shaft, and the shift-by-wire device, according to any one of the respective embodiments of the invention, which drives the manual shaft, that is, fundamentally, the shift-by-wire device connected communicatively to an administrative electronic control unit, which inputs thereinto a signal from a shift position sensor for detection of a demanded shift position demanded by a driver, to drivingly control a manual shaft on the basis of a shift command from the administrative electronic control unit, the shift-by-wire device comprising a shaft position sensor that detects a rotating angle of the manual shaft, a drive unit that drives an actuator of the manual shaft, an operational function unit including an operational CPU that inputs thereinto a rotating angle of the shaft from the shaft position sensor, receives a shift command from the administrative electronic control unit to transmit the rotating angle of the shaft thus input to the administrative electronic control unit, and controls the drive unit on the basis of the rotating angle of the shaft thus input and the shift command thus received, and a monitoring function unit including a monitoring CPU that inputs thereinto a rotating angle of the shaft from the shaft position sensor to monitor the presence of abnormality in the operational function unit and transmits the rotating angle of the shaft thus input to the administrative electronic control unit when it is determined that abnormality occurs in the operational function unit.

Since the transmission device according to the invention mounts thereon the shift-by-wire device according to any one of the respective embodiments of the invention, it can produce effects produced by the shift-by-wire device of the invention, for example, an effect, in which the administrative electronic control unit can receive a rotating angle of the shaft from the shaft position sensor irrespective of the presence of abnormality in the operational function unit, an effect, in which as compared with an arrangement, in which an actuator for driving of a manual shaft and ECU for control thereof comprises a dual system, it is possible to make a device further compact, and the like.

BRIEF DESCRIPTION OF THE DRAWINGS

FIG. 2 is a view showing an operation table of an automatic transmission 20.

DETAILED DESCRIPTION OF THE EMBODIMENTS

Subsequently, a best mode for carrying out the invention will be described using an embodiment.

Figure 1:
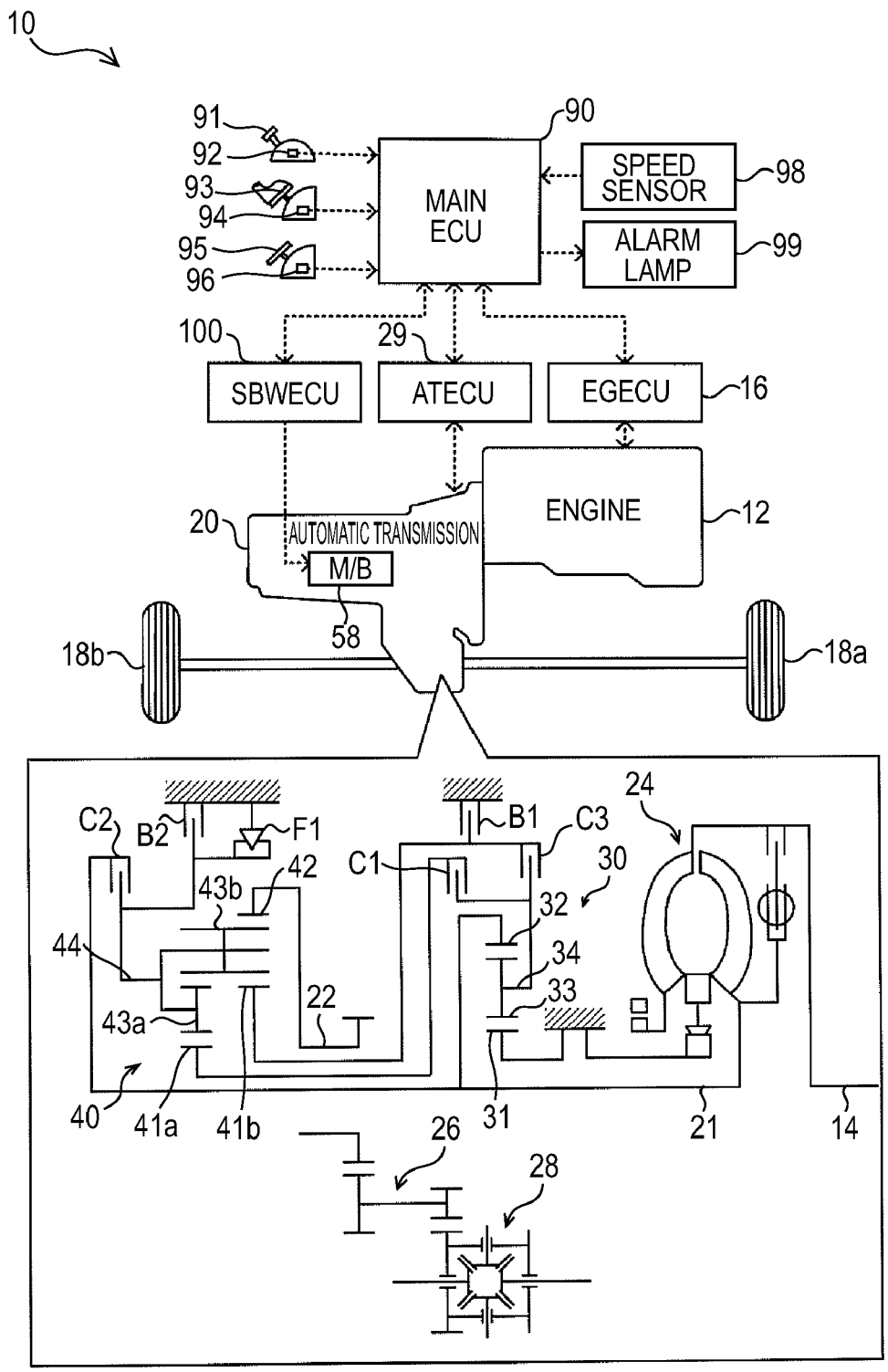
FIG. 1 is a configuration showing an outline of the construction of an automobile 10 mounting thereon a transmission device as an embodiment of the invention.
Figure 3:
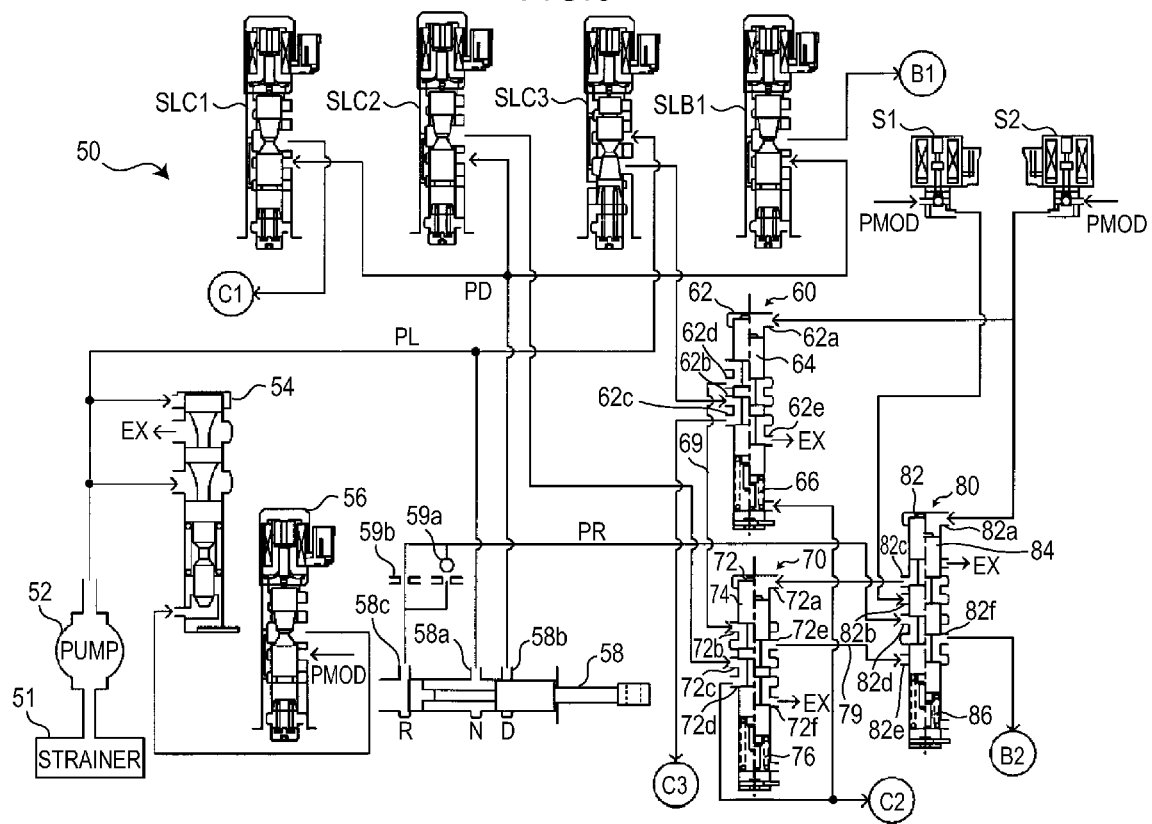
FIG. 3 is a configuration showing an outline of the construction of a hydraulic circuit 50 of the automatic transmission 20.
Figure 4:
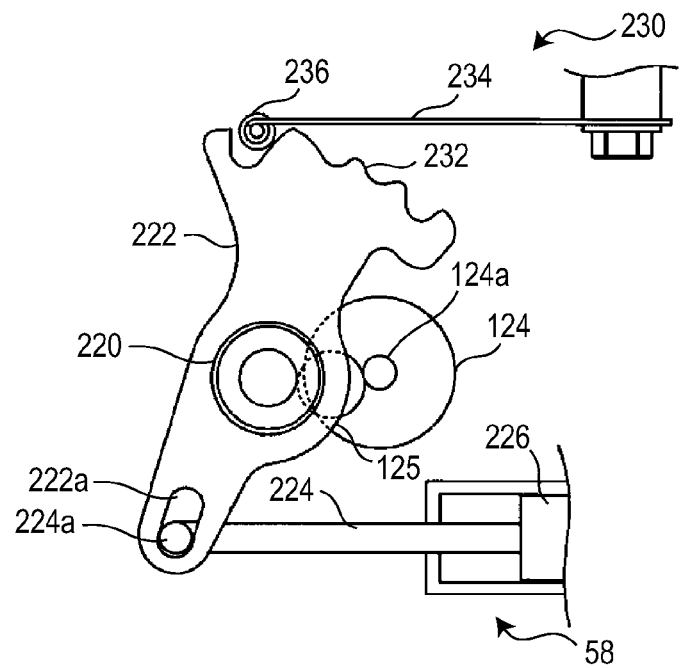
FIG. 4 is a configuration showing an outline of the construction of a driving system that drives a manual valve 58.

FIG. 1 is a view showing an outline of a configuration of an automobile 10 mounting thereon a transmission device as an embodiment of the invention, FIG. 2 shows an operation table of an automatic transmission 20, FIG. 3 is a view showing an outline of a construction of a hydraulic circuit 50 of the automatic transmission 20, and FIG. 4 is a view showing an outline of a configuration about a manual valve 58 of the automatic transmission 20. The automobile 10 according to the embodiment comprises, as shown in FIG. 1, an engine 12, as an internal combustion engine, which outputs power owing to explosive combustion of a hydro-carbon fuel such as gasoline, gas oil, etc., an engine electronic control unit (referred below to as engine ECU) 16 that drivingly controls the engine 12, a torque converter 24 provided with a lockup clutch and mounted to a crankshaft 14 of the engine 12, a stepped automatic transmission 20, an input shaft 21 of which is connected to an output side of the torque converter 24, an output shaft 22 of which is connected to drive wheels 18a, 18b through a gear mechanism 26 and a differential gear 28, and which changes power input into the input shaft 21 in speed to transmit the same to the output shaft 22, an automatic transmission electronic control unit (referred below to as ATECU) 29 and a shift-by-wire system electronic control unit (referred below to as SBWECU) 100 that control the automatic transmission 20, and a main electronic control unit (referred below to as main ECU) 90 that controls a vehicle as a whole.

The engine ECU 16 is constituted as a microprocessor about CPU while not shown in detail, and comprises a ROM that stores a processing program, a RAM that stores data temporarily, input-output ports, and a communication port in addition to CPU. Input into the engine ECU 16 through an input port are signals from various sensors, such as a rotational frequency sensor mounted to the crankshaft 14, etc., the signals being required for operational control of the engine 12, and output from the engine ECU 16 through an output port are a drive signal to a throttle motor for adjustment of a throttle opening degree, a control signal to a fuel injection valve, an ignition signal to an ignition plug, etc. The engine ECU 16 communicates with the main ECU 90 to control the engine 12 according to a control signal from the main ECU 90, or to output to the main ECU 90 data with respect to an operating state of the engine 12 at need.

The automatic transmission 20 is constituted as a stepped transmission of six-speed gear change as shown in FIG. 1 to comprise a single pinion type planetary gear mechanism 30, a Ravigneaux type planetary gear mechanism 40, three clutches C1, C2, C3, two brakes B1, B2, and a one-way clutch F1. The single pinion type planetary gear mechanism 30 comprises a sun gear 31 as an external gear, a ring gear 32 as an internal gear arranged to be concentric with the sun gear 31, a plurality of pinion gears 33, which mesh with the sun gear 31 and mesh with the ring gear 32, and a carrier 34 that holds the plurality of pinion gears 33 to enable the same to make rotation and revolution, the sun gear 31 being fixed to a case, and the ring gear 32 being connected to the input shaft 21. The Ravigneaux type planetary gear mechanism 40 comprises two sun gears 41a, 41b being external gears, a ring gear 42 being an internal gear, a plurality of short pinion gears 43a that mesh with the sun gear 41a, a plurality of long pinion gears 43b that mesh with the sun gear 41b and the plurality of short pinion gears 43a and mesh with the ring gear 42, and a carrier 44 that connects between the plurality of short pinion gears 43a and the plurality of long pinion gears 43b to hold the same to enable the same to make rotation and revolution, the sun gear 41a being connected to the carrier 34 of the single pinion type planetary gear mechanism 30 through the clutch C1, the sun gear 41b being connected to the carrier 34 through the clutch C3 and connected to the case through the brake B1, the ring gear 42 being connected to the output shaft 22, and the carrier 44 being connected to the input shaft 21 through the clutch C2. Also, the carrier 44 is connected to the case through the brake B2 and connected to the case through the one-way clutch F1.

With the automatic transmission 20 thus constructed, ON/OFF (ON is called engagement, OFF is called release of engagement, and the same is said to the following) of the clutches C1 to C3 and ON/OFF of the brakes B1, B2 are combined to enable switching of forward travel 1-speed to 6-speed, rearward travel, and neutral. As shown in FIG. 2, the state of forward travel 1-speed can be brought about by making the clutch C1 ON and making the clutches C2, C3 and the brakes B1, B2 OFF (making the brake B2 ON at the time of engine braking), the state of forward travel 2-speed can be brought about by making the clutch C1 and the brake B1 ON and making the clutches C2, C3 and the brake B2 OFF, the state of forward travel 3-speed can be brought about by making the clutches C1, C3 ON and making the clutch C2 and the brakes B1, B2 OFF, the state of forward travel 4-speed can be brought about by making the clutches C1, C2 ON and making the clutch C3 and the brakes B1, B2 OFF, the state of forward travel 5-speed can be brought about by making the clutches C2, C3 ON and making the clutch C1 and the brakes B1, B2 OFF, and the state of forward travel 6-speed can be brought about by making the clutch C2 and the brake B1 ON and making the clutches C1, C3 and the brake B2 OFF. Also, the state of rearward travel can be brought about by making the clutch C3 and the brake B2 ON and making the clutches C1, C2 and the brake B1 OFF. The state of neutral can be brought about by making all the clutches C1 to C3 and the brakes B1, B2 OFF.

The clutches C1 to C3 and the brakes B1, B2 on the automatic transmission 20 are driven by a hydraulic circuit 50. The hydraulic circuit 50 comprises, as shown in FIG. 3, a mechanical oil pump 52 that makes use of power from the engine 12 to draw a working oil from a strainer 51 to pressure-feed the same, a regulator valve 54 that regulates pressure (line pressure PL) of the working oil pressure-fed by the mechanical oil pump 52, a linear solenoid 56 that drives the regulator valve 54 making use of a modulator pressure PMOD input from the line pressure PL through a modulator valve (not shown), a manual valve 58 including an input port 58a, into which the line pressure PL is input, a D-position output port 58b, and an R-position output port 58c, a normally closed type linear solenoid SLC1 that inputs thereinto a drive pressure PD from the D-position output port 58b of the manual valve 58 to make pressure regulation of the same to output the same to the clutch C1, a normally closed type linear solenoid SLC2 that inputs thereinto a drive pressure PD from the D-position output port 58b of the manual valve 58 to make pressure regulation of the same to output the same, a normally opened type linear solenoid SLC3 that inputs thereinto the line pressure PL to make pressure regulation of the same to output the same, a normally closed type linear solenoid SLB1 that inputs thereinto the drive pressure PD from the D-position output port 58b of the manual valve 58 to make pressure regulation of the same to output the same to the brake B1, a C3 relay valve 60 that inputs thereinto an SLC3 pressure being an output pressure from the linear solenoid SLC3 to selectively output the same to the clutch C3 or a further oil passage 69, a C2 relay valve 70 that inputs thereinto an output pressure from the C3 relay valve 60 through the further oil passage 69 to selectively output the same to the clutch C2 or a further oil passage 79 and inputs thereinto an SLC2 pressure being an output pressure from the linear solenoid SLC2 to output the SLC2 pressure to the oil passage 79 when an output pressure from the C3 relay valve 60 is to be output to the clutch C2 and to shut off the SLC2 pressure when an output pressure from the C3 relay valve 60 is to be output to the oil passage 79, a B2 relay valve 80 that selectively inputs thereinto an output pressure output to the oil passage 79 from the C2 relay valve 70 and a reverse pressure PR output from the R-position output port 58c of the manual valve 58 to output the same to the brake B2, a normally opened type ON/OFF solenoid S1 that makes use of the modulator pressure PMOD input from the line pressure PL through the modulator valve to output a driving signal pressure to the C2 relay valve 70, a normally closed type ON/OFF solenoid S2 that makes use of the modulator pressure PMOD input from the line pressure PL through the modulator valve to output a driving signal pressure to the C3 relay valve 60 and the B2 relay valve 80, etc. In addition, a check valve 59a and an orifice 59b in parallel to the check valve 59a are provided between the R-position output port 58c of the manual valve 58 and an input port 82d of the B2 relay valve 80 in a direction toward the B2 relay valve 80.

The C3 relay valve 60 comprises a sleeve 62, on which are formed a signal pressure input port 62a for inputting thereinto a signal pressure from the ON/OFF solenoid S2, an input port 62b for inputting thereinto an output pressure (SLC3 pressure) from the linear solenoid SLC3, an output port 62c for outputting an oil pressure to the clutch C3, an output port 62d for outputting an oil pressure to the oil passage 69, and a drain port 62e, a spool 64 that slides axially in the sleeve 62, and a spring 66 that biases the spool 64 axially. With the C3 relay valve 60, when a signal pressure is not input into the signal pressure input port 62a from the ON/OFF solenoid S2, the spool 64 is caused by the bias of the spring 66 to move to a position in a region in the left half of the figure to provide communication between the input port 62b and the output port 62c (toward the clutch C3) and to shut off communication between the input port 62b and the output port 62d (toward the C2 relay valve 70), and when a signal pressure is input into the signal pressure input port 62a from the ON/OFF solenoid S2, the signal pressure overcomes the bias of the spring 66 to cause the spool 64 to move to a position in a region in the right half of the figure to shut off communication between the input port 62b and the output port 62c (toward the clutch C3) and to provide communication between the input port 62b and the output port 62d (toward the C2 relay valve 70). In addition, when communication between the input port 62b and the output port 62c (toward the clutch C3) is shut off, communication is correspondingly provided between the output port 62c and the drain port 62e, so that a working oil on a side of the clutch C3 is drained.

The C2 relay valve 70 comprises a sleeve 72, on which are formed a signal pressure input port 72a for inputting thereinto a signal pressure from the ON/OFF solenoid S1, an input port 72b for inputting thereinto an output pressure output to the oil passage 69 from the C3 relay valve 60, an input port 72c for inputting thereinto an output pressure (SLC2 pressure) from the linear solenoid SLC2, an output port 72d for outputting an oil pressure to the clutch C2, an output port 72e for outputting an oil pressure to the oil passage 79, and a drain port 72f, a spool 74 that slides axially in the sleeve 72, and a spring 76 that biases the spool 74 axially. With the C2 relay valve 70, when a signal pressure is not input into the signal pressure input port 72a from the ON/OFF solenoid S1, the spool 74 is caused by the bias of the spring 76 to move to a position in a region in the left half of the figure to provide communication between the input port 72b (toward the C2 relay valve 60) and the output port 72e (toward the B2 relay valve 80) and to provide communication between the output port 72c (toward the linear solenoid SLC2) and the output port 72d (toward the clutch C2), and when a signal pressure is input into the signal pressure input port 72a from the ON/OFF solenoid S1, the signal pressure overcomes the bias of the spring 76 to cause the spool 76 to move to a position in a region in the right half of the figure to shut off the input port 72b (toward the C2 relay valve 60) to provide communication between the input port 72c (toward the linear solenoid SLC2) and the output port 72e (toward the B2 relay valve 80) and to shut off communication between the input port 72c and the output port 72d (toward the clutch C2). In addition, when communication between the input port 72c and the output port 72d (toward the clutch C2) is shut off, communication is correspondingly provided between the output port 72d and the drain port 72f, so that a working oil on a side of the clutch C2 is drained.

The B2 relay valve 80 comprises a sleeve 82, on which are formed a signal pressure input port 82a for inputting thereinto a signal pressure from the ON/OFF solenoid S2, a signal pressure input port 82b for outputting a signal pressure from the ON/OFF solenoid S1 to the signal pressure input port 72a of the C2 relay valve 70 through the B2 relay valve 80, a signal pressure output port 82c, an input port 82d for inputting thereinto the reverse pressure PR from the R-position output port 58c of the manual valve 58, an input port 82e for inputting thereinto an output pressure from the output port 72e of the C2 relay valve 70, and an output port 82f for outputting an oil pressure to the brake B2, a spool 84 that slides axially in the sleeve 82, and a spring 86 that biases the spool 84 axially. With the B2 relay valve 80, when a signal pressure is not input into the signal pressure input port 82a from the ON/OFF solenoid S2, the spool 84 is caused by the bias of the spring 86 to move to a position in a region in the left half of the figure to shut off the signal pressure input port 82b to make a signal pressure to the signal pressure input port 72a of the C2 relay valve 70 OFF to provide communication between the input port 82d (toward the R-position output port 58c of the manual valve 58) and the output port 82f (toward the brake B2) and to shut off the input port 82e (toward the C2 relay valve 70), and when a signal pressure is input into the signal pressure input port 82a from the ON/OFF solenoid S2, the signal pressure overcomes the bias of the spring 86 to cause the spool 86 to move to a position in a region in the right half of the figure to provide communication between the S1 signal pressure input port 82b and the S1 signal pressure output port 82c to bring about a state, in which a signal pressure from the ON/OFF solenoid S1 can be output to the signal pressure input port 72a of the C2 relay valve 70 through the signal pressure input port 82b and the signal pressure output port 82c, to shut off the input port 82d (toward the R-position output port 58c of the manual valve 58) and to provide communication between the input port 82e (toward the C2 relay valve 70) and the output port 82f (toward the clutch C3).

As shown in FIG. 4, the manual valve 58 comprises a manual plate 222 mounted to a manual shaft 220, a spool 224 formed at a tip end thereof with an L-shaped hook 224a, which is latched in a slot 222a formed in a position (end) being eccentric relative to a rotating shaft of the manual shaft 220 on the manual plate 222, and a land 226 formed on the spool 224, and an electric motor 124 having a rotating shaft (a rotor 124a) thereof connected to the manual shaft 220 through a reduction gear 125 is driven to convert rotational movement of the manual shaft 220 into linear movement whereby switching is made according to a stroke magnitude of the spool among a state, in which communication between the input port 58a and the both output ports 58b, 58c is shut off, a state, in which communication between the input port 58a and the D-position output port 58b is provided and communication between the input port 58a and the R-position output port 58c is shut off, and a state, in which communication between the input port 58a and the D-position output port 58b is shut off and communication between the input port 58a and the R-position output port 58c is provided. In addition, provided on the manual plate 222 is a detent mechanism 230 comprising a plate-shaped detent spring 234, a base end of which is fixed to a case of the automatic transmission 20 by a bolt, and a roller 236 mounted rotatably to a tip end of the detent spring 234 and brought into pressure contact with a cam surface 232, mountains and valleys of which are alternately formed at an end of the manual plate 222.

While not shown in detail, the ATECU 29 is constituted as a microprocessor about CPU to comprise a ROM that stores a processing program, a RAM that stores data temporarily, input-output ports, and a communication port in addition to CPU. The ATECU 29 inputs thereinto an input shaft rotational frequency Nin from a rotational frequency sensor mounted to the input shaft 21, an output shaft rotational frequency Nout from a rotational frequency sensor mounted to the output shaft 22, etc. through an input port, and the ATECU 29 outputs drive signals to the linear solenoid 56, SLC1 to SLC3, and SLB1 and drive signals to the ON/OFF solenoids S1 and S2 through an output port. The ATECU 29 communicates with the main ECU 90 to control the automatic transmission 20 (the hydraulic circuit 50) according to a control signal from the main ECU 90 and to output to the main ECU 90 data regarding to a state of the automatic transmission 20 at need.

Figure 5:
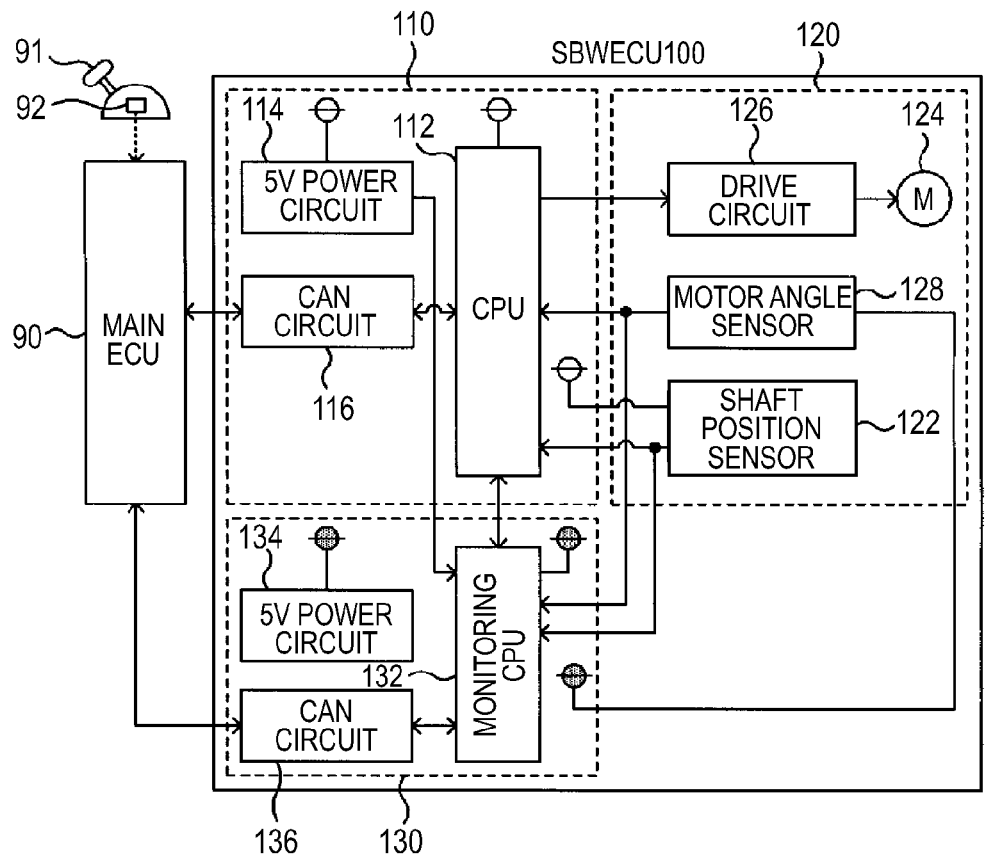
FIG. 5 is a configuration showing an outline of the construction of an SBWECU 100.
Figure 6:
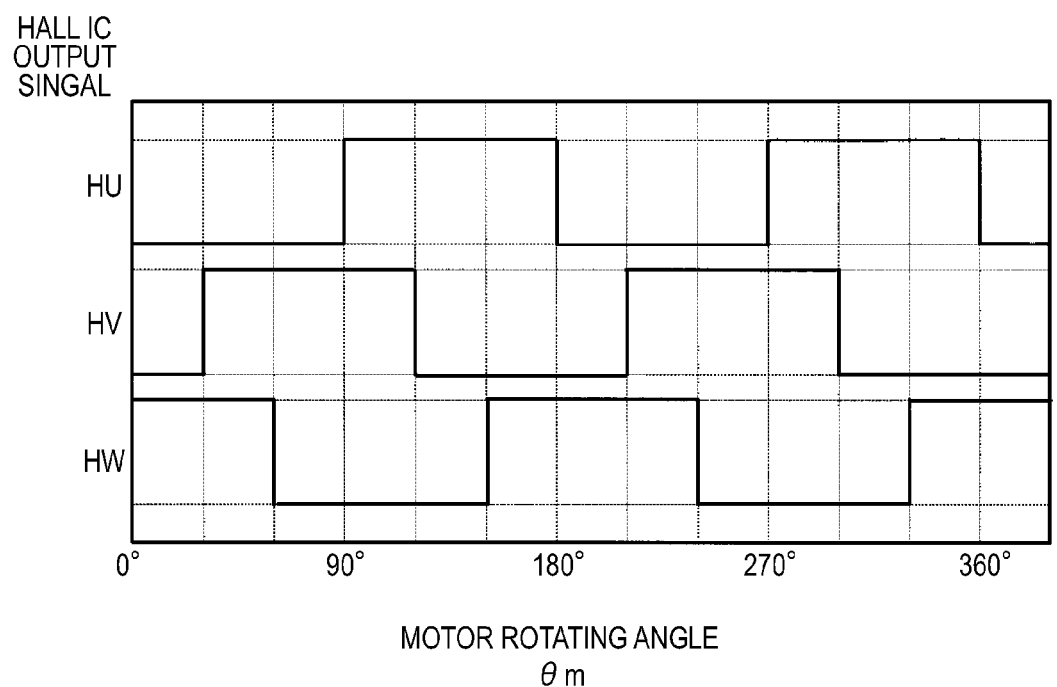
FIG. 6 is a view illustrating an example of the relationship among output signals HU, HV, HW of three hall ICs and a motor rotating angle θm.

As shown in FIG. 5, the SBWECU 100 comprises an operational function unit 110 provided with a CPU 112 as a central processing circuit, an actuator function unit 120 that functions as an actuator for driving of the manual valve 58, and a monitoring function unit 130 that monitors the operational function unit 110 mainly. The operational function unit 110 comprises, in addition to the CPU 112, a 5V power circuit 114 for supplying of power to respective units, and a CAN circuit 116 that CAN-communicates with the main ECU 90. Also, the monitoring function unit 130 comprises a monitoring CPU 132 for monitoring, a 5V power circuit 134 for supplying of power to respective units, and a CAN circuit 136 that CAN-communicates with the main ECU 90. The actuator function unit 120 comprises a shaft position sensor 122 that receives electricity from the 5V power circuit 114 of the operational function unit 110 to actuate to detect a rotating angle of the manual shaft 220 of the manual valve 58, the electric motor 124 being as a brushless motor to drive the manual shaft 220 as the rotor 124a having a permanent magnet stuck thereto is rotationally driven, a drive circuit 126 for driving of the electric motor 124, and a brushless-motor controlling motor angle sensor 128 that receives electricity from the 5V power circuit 134 of the monitoring function unit 130 to actuate to detect a rotating angle of the electric motor 124. The CPU 112 of the operational function unit 110 inputs thereinto a shaft position POS from the shaft position sensor 122, a motor rotating angle $\theta$m from the motor angle sensor 128, etc., and the CPU 112 outputs a drive signal to the drive circuit 126. Also, like the operational function unit 110, the monitoring CPU 132 of the monitoring function unit 130 inputs thereinto a shaft position POS and a motor rotating angle $\theta$m from the motor angle sensor 128, etc. In addition, the motor angle sensor 128 in the embodiment comprises three hall ICs arranged in three locations every phase of UVW of a stator to detect a magnetic position of the rotor 124a of the electric motor 124. FIG. 6 shows an example of the relationship among output signals HU, HV, HW of the three hall ICs and a motor rotating angle $\theta$m. As shown in the figure, the motor angle sensor 128 detects rise edges and fall edges of the output signals HU, HV, HW to detect a motor rotating angle $\theta$m. While the shaft position sensor 122 receives electricity from the 5V power circuit 114 of the operational function unit 110 to actuate and the motor angle sensor 128 receives electricity from the 5V power circuit 134 of the monitoring function unit 130 to actuate as described above, the motor angle sensor 128 is constituted as described above to have no influences on its detection accuracy even when some error in supply voltage is generated between the 5V power circuit 114 and the 5V power circuit 134.

While not shown in detail, the main ECU 90 is constituted as a microprocessor about CPU to comprise a ROM that stores a processing program, a RAM that stores data temporarily, input-output ports, and a communication port in addition to CPU. The main ECU 90 inputs thereinto a shift position SP from a shift position sensor 92 for detection of an operated position of a shift lever 91, an accelerator opening degree Acc from an accelerator pedal position sensor 94 for detection of a trodden quantity of an accelerator pedal 93, a brake switch signal BSW from a brake switch 96 for detection of a brake pedal 95 being trodden, and a vehicle speed V from a speed sensor 98 through an input port, and the main ECU 90 outputs a lighting signal to an alarm lamp 99, etc. through an output port. As described above, the main ECU 90 is connected to the engine ECU 16, the ATECU 29, and the SBWECU 100 through a communication port to give and take various control signals and data from the engine ECU 16, the ATECU 29, and the SBWECU 100.

With the automobile 10, according to the embodiment, thus constructed, normally, when the shift lever 91 is shift-operated to a parking (P) position, the main ECU 90 transmits a P position shift command signal to the SBWECU 100 and the ATECU 29 whereby the SBWECU 100 having received a shift command signal (shift position SP) drivingly controls the electric motor 124 by the drive circuit 126 so that a valve position VP based on a shaft position POS from the shaft position sensor 122 agrees with a P position valve position, and the ATECU 29 having received a shift command signal makes the linear solenoid SLC3 and the ON/OFF solenoid S1 ON and makes the linear solenoids SLC1, SLC2, SLB1 and the ON/OFF solenoid S2 OFF. Also, when the shift lever 91 is shift-operated to a reverse (R) position, the main ECU 90 transmits an R position shift command signal to the SBWECU 100 and the ATECU 29 whereby the SBWECU 100 having received a shift command signal through a shift command circuit 108 drivingly controls the electric motor 124 by the drive circuit 126 so that a valve position VP based on a shaft position POS from the shaft position sensor 122 agrees with an R position valve position, and the ATECU 29 having received a shift command signal makes the ON/OFF solenoid S1 ON and makes the linear solenoids SLC1 to SLC3, SLB1 and the ON/OFF solenoid S2 OFF. Further, when the shift lever 91 is shift-operated to an N position, the main ECU 90 transmits a neutral (N) position shift command signal to the SBWECU 100 and the ATECU 29 whereby the SBWECU 100 having received a shift command signal through the shift command circuit 108 drivingly controls the electric motor 124 by the drive circuit 126 so that a valve position VP based on a shaft position POS from the shaft position sensor 122 agrees with an N position valve position, and the ATECU 29 having received a shift command signal makes the ON/OFF solenoids S1, S2 and the linear solenoid SLC3 ON and makes the linear solenoids SLC1, SLC2, SLB1 OFF. Also, when the shift lever 91 is shift-operated to a drive (D) position, the main ECU 90 transmits a D position shift command signal to the SBWECU 100 and the ATECU 29 and transmits an accelerator opening degree Acc from the accelerator pedal position sensor 94 and a vehicle speed V from the speed sensor 98 to the ATECU 29 whereby the SBWECU 100 having received a shift command signal through the shift command circuit 108 drivingly controls the electric motor 124 by the drive circuit 126 so that a valve position VP based on a shaft position POS from the shaft position sensor 122 agrees with a D position valve position, and the ATECU 29 having received the accelerator opening degree Acc and the vehicle speed V sets any one of forward travel 1-speed to 6-speed using a variable speed map on the basis of the accelerator opening degree Acc and the vehicle speed V and drivingly controls the linear solenoids 56, SLC1 to SLC3, SLB1 and the ON/OFF solenoids S1, S2 so that a clutch and a brake, according to the number of speed as set, out of the clutches C1 to C3 and the brakes B1, B2 are made ON.

Figure 7:
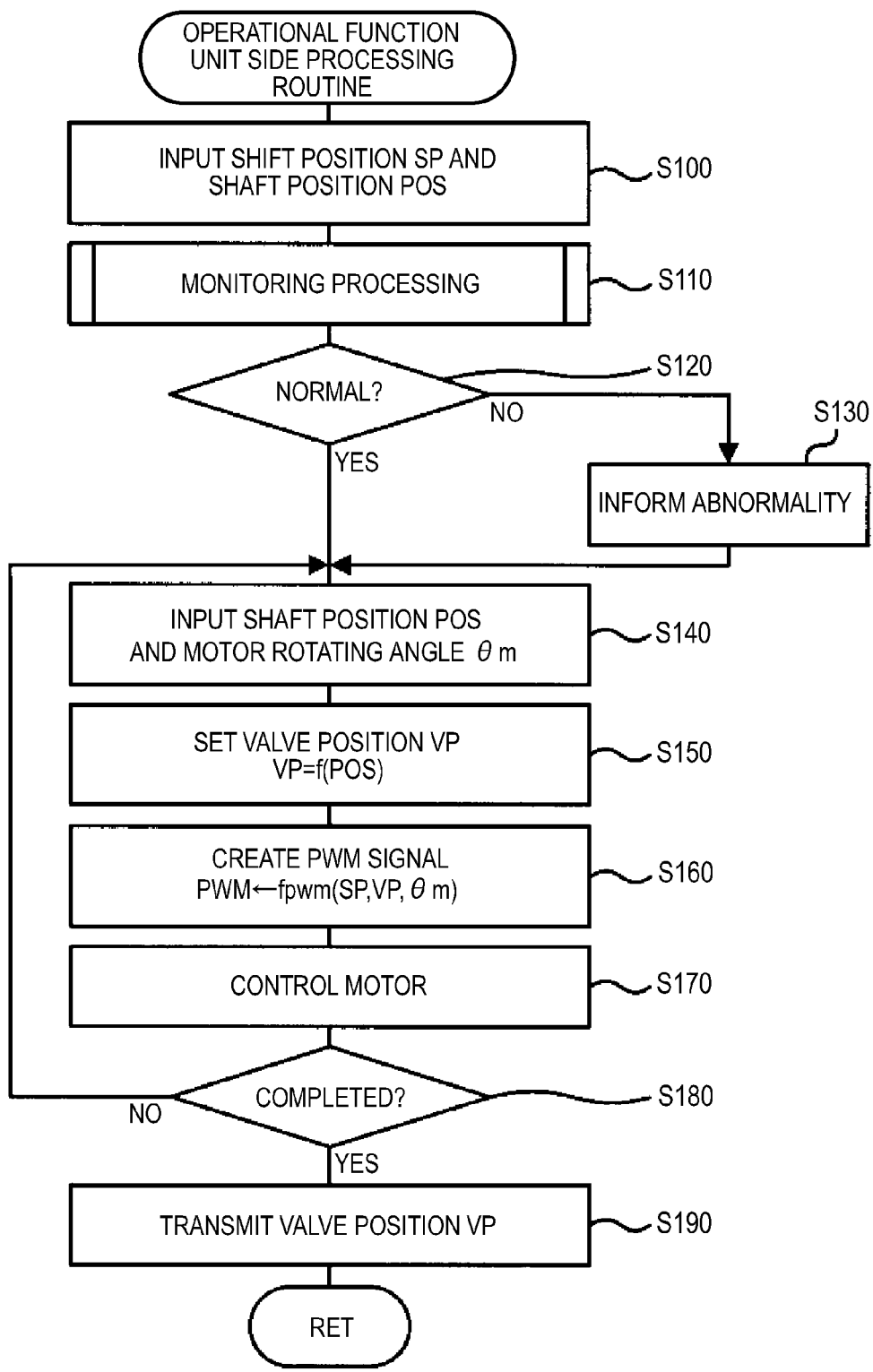
FIG. 7 is a flowchart illustrating an example of an operational function unit side processing routine executed by an operational function unit 110 of the SBWECU 100.

Subsequently, an explanation will be given to the operation of a transmission device thus constructed according to the embodiment and provided on the automobile 10, in particular, the operation of the operational function unit 110 and the operation of the monitoring function unit 130 in the SBWECU 100. The operation of the operational function unit 110 will be first described and then the operation of the monitoring function unit 130 will be described. Hereupon, the transmission device according to the embodiment corresponds to the automatic transmission 20, the main ECU 90, the ATECU 29, and the SBWECU 100 and the shift-by-wire device according to the embodiment corresponds to the SBWECU 100. FIG. 7 is a flowchart illustrating an example of an operational function unit side processing routine executed by the operational function unit 110 of the SBWECU 100. The routine is repeatedly executed every a predetermined period of time (for example, every several tens of msec).

When the operational function unit side processing routine is executed, the CPU 112 of the operational function unit 110 first executes a processing of inputting data required for controlling a shift position SP as a shift command signal and a shaft position POS from the shaft position sensor 122 (STEP S100). Hereupon, the shift position SP in the embodiment is obtained by receiving one transmitted as a shift command signal from the main ECU 90 by communication to input the same.

Succeedingly, a monitoring processing, in which it is determined whether abnormality occurs in the monitoring function unit 130, is executed (STEP S110), when the monitoring function unit 130 is normal, the routine proceeds to the next processing, and when the monitoring function unit is not normal, that is, abnormal, information of abnormality is transmitted to the main ECU 90 (STEP S130).

Figure 8:
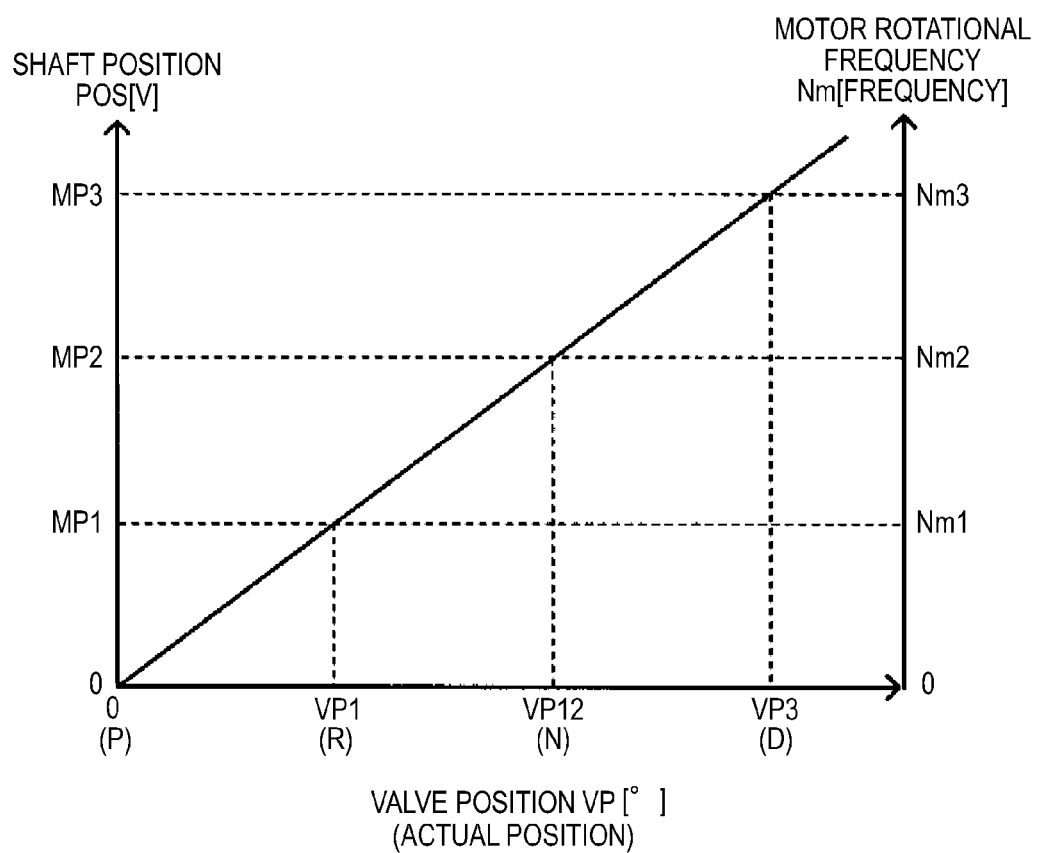
FIG. 8 is a view illustrating the relationship between a shaft position POS, a motor rotational frequency Nm, and a valve position VP.

A shaft position POS from the shaft position sensor 122 and a motor rotating angle θm from the motor angle sensor 128 are input (STEP S140), and a valve position VP of the manual valve 58 is set on the basis of the shaft position POS thus input (STEP S150). Hereupon, the valve position VP in the embodiment is set by beforehand finding the relationship between a shaft position POS and a valve position VP to store the same as map in the ROM and deducing a corresponding valve position VP from the map when a shaft position POS is given. FIG. 8 shows an example of the map. In FIG. 8, a value 0, a value VP1, a value VP2, and a value VP3, respectively, of a valve position VP correspond to a value MP1, a value MP2, and a value MP3 of a shaft position POS and correspond to a value Nm1, a value Nm2, and a value Nm3 of a motor rotational frequency Nm described later.

When a valve position VP is set, a PWM (pulse width modulation) signal for driving of the electric motor 124 is created on the basis of a valve position VP as set, a shift position SP as input, and a motor rotating angle θm (STEP S160), the PWM signal thus created is output to the drive circuit 126 to drivingly control the electric motor 124 (STEP S170), the routine is returned to STEP S140 to repeat the processings of STEP S140 to STEP S170, and when driving of the manual valve 58 is completed, that is, the valve position VP is positioned corresponding to the shift position SP (STEP S180), a present valve position VP (actual shift position) is transmitted to the main ECU 90 (STEP S190) to terminate the routine.

Figure 9:
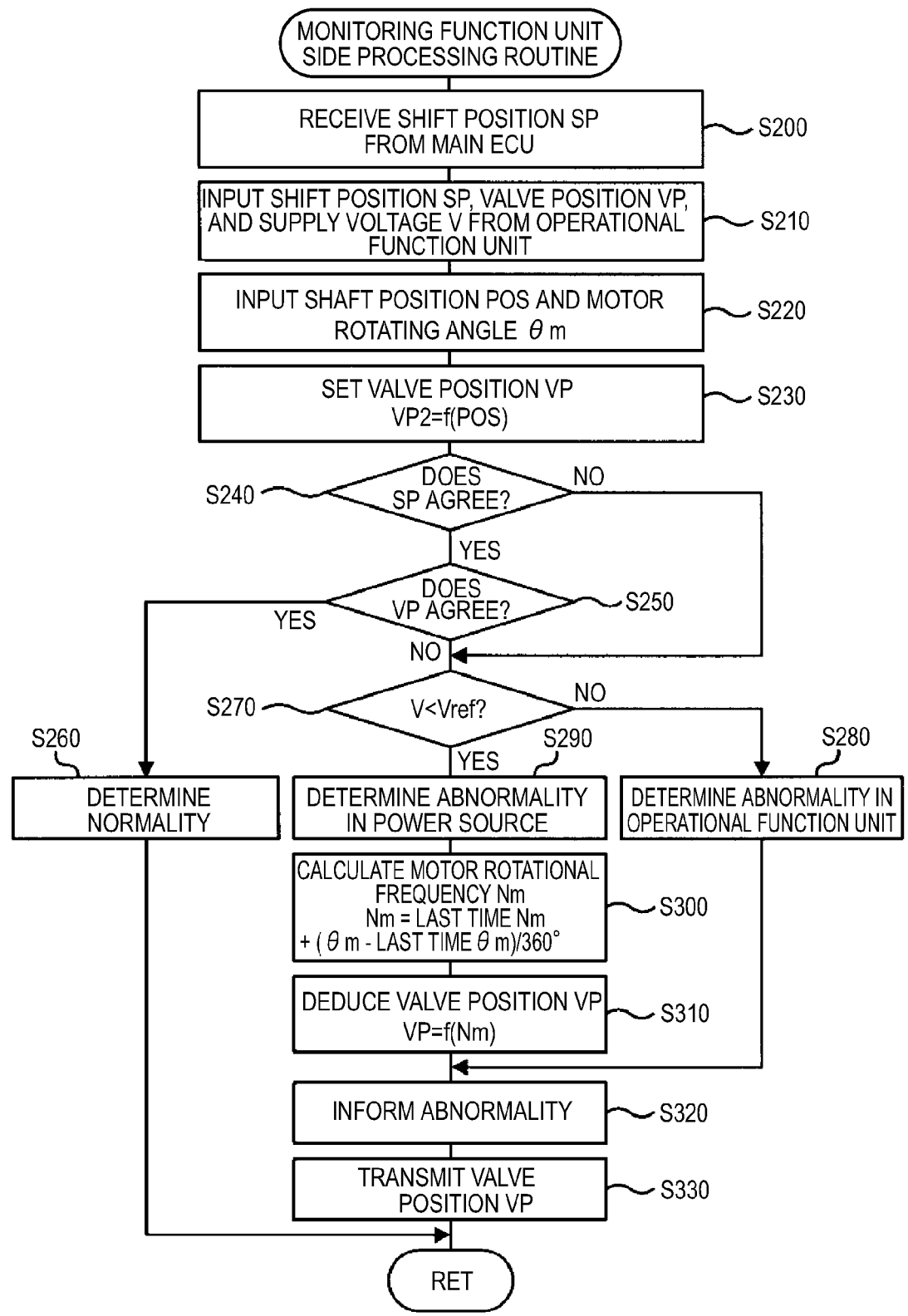
FIG. 9 is a flowchart illustrating an example of a monitoring function unit side processing routine executed by a monitoring function unit 130 of the SBWECU 100.

Subsequently, an explanation will be given to the operation of the monitoring function unit 130. FIG. 9 is a flowchart illustrating an example of a monitoring function unit side processing routine executed by the monitoring function unit 130 of the SBWECU 100. The routine is repeatedly executed every a predetermined period of time (for example, every several tens of msec).

When the monitoring function unit side processing routine is executed, the monitoring CPU 132 of the monitoring function unit 130 first receives a shift position SP from the main ECU 90 (STEP S200), inputs thereinto a shift position SP and a valve position VP from the operational function unit 110 and a supply voltage V of the 5V power circuit 114 (STEP S210), inputs thereinto a shaft position POS from the shaft position sensor 122 and a motor rotating angle θm from the motor angle sensor 128 (STEP S220), and sets a valve position VP using the map of FIG. 8 on the basis of the shaft position POS thus input (STEP S230).

Succeedingly, it is determined whether the shift position SP directly received from the main ECU 90 and the shift position SP received through the operational function unit 110 agree with each other (STEP S240), and it is determined whether the valve position VP set and input by the operational function unit 110 and the valve position VP set in STEP S230 agree with each other (STEP S250). When affirmative judgments for the both are made in the determination, the operational function unit 110 determines normality (STEP S260) to terminate the routine. When a negative judgment is given in either of the determinations in STEP S240 and STEP S250, it is then determined whether a supply voltage V from the 5V power circuit 114 of the operational function unit 110 is less than a threshold value Vref (for example, 4.5 V or the like) (STEP S270), and when the supply voltage V is not less than the threshold value Vref, that is, equal to or higher than the threshold value Vref, it is determined that abnormality occurs in the CPU 112 or the CAN circuit 116 of the operational function unit 110 (STEP S280) to inform the main ECU 90 of the abnormality by communication (STEP S320) and to transmit the valve position VP set in STEP S230 (STEP S330), thus terminating the processing.

When it is determined in STEP S270 that the supply voltage V is less than the threshold value Vref, it is determined that abnormality occurs in the 5V power circuit 114 of the operational function unit 110 (STEP S290) and the following formula (I) is used to calculate a motor rotational frequency Nm on the basis of a motor rotating angle θm as input (STEP S300). The motor rotational frequency Nm is calculated as a cumulative value of the rotational frequency of the electric motor 124, "last time Nm" in the formula (I) indicates a motor rotational frequency Nm calculated in the routine at the last time and "last time θm" indicates a motor rotating angle θm used in the routine at the last time.

$$Nm = \text{last time } Nm + (\theta m - \text{last time } \theta m)/360° \quad (1)$$

A valve position VP is deduced using the map of FIG. 8 on the basis of the motor rotational frequency Nm thus calculated (STEP S310), the main ECU 90 is informed of abnormality by communication (STEP S320), and the valve position VP thus deduced is transmitted (STEP S330), thus terminating the processing.

In addition, while as shown in STEP S110 of the operational function unit side processing routine of FIG. 7 in the embodiment, the operational function unit 110 monitors the monitoring function unit 130 to thereby perform mutual monitoring, monitoring by the operational function unit 110 can be performed in the same processing as that in the monitoring function unit side processing routine of FIG. 9.

When being informed of abnormality of the monitoring function unit 130 from the operational function unit 110, the main ECU 90 lights up the alarm lamp 99 in order to inform a driver of such information, control described above at the time of normality is continuously executed since the operational function unit 110 is normal. Also, when information of abnormality of the operational function unit 110 is received from the monitoring function unit 130, a valve position VP is also received together therewith, so that the alarm lamp 99 is lighted up and instead of control at the time of normality, in the case where during traveling with, for example, the shift lever 91 in the D position, information of abnormality is received from the SBWECU 100 and a position corresponding to a D position is received as a present valve position VP, traveling is continued holding a shift position (D position) corresponding to the present valve position VP when a vehicle speed V is equal to or higher than the threshold value Vref, and when a vehicle speed V becomes less than the threshold value Vref, all the clutches C1 to C3 and the brakes B1, B2 are made OFF to be set to an N position to shut off power from the engine 12 even when the shift lever 91 is in the D position and the present valve position VP of the manual valve 58 corresponds to the D position. Accordingly, even when abnormality occurs in the SBWECU 100 during traveling, it is possible to perform withdrawal traveling such as stoppage of a vehicle on the shoulder of a road.

The transmission device according to the embodiment described above incorporates thereinto the operational function unit 110 drivingly controlling the actuator function unit 120, which communicates with the main ECU 90 to receive a shift command signal (shift position SP) to drive the manual valve 58, and setting a valve position VP of the manual valve 58 from a shaft position POS from the shaft position sensor 122 to transmit the same to the main ECU 90, and the monitoring function unit 130 that can communicate with the main ECU 90 to input thereinto a shaft position POS from the shaft position sensor 122 and monitors abnormality of the operational function unit 110, and since the transmission device sets a valve position VP of the manual valve 58 from a shaft position POS from the shaft position sensor 122 to transmit the same to the main ECU 90 when the monitoring function unit 130 determines that abnormality occurs in the operational function unit 110, the main ECU 90 can grasp a present valve position VP of the manual valve 58 irrespective of the presence of abnormality in the operational function unit 110. Consequently, the main ECU 90 can cope appropriately with a possible abnormality in the SBWECU 100. Moreover, since the motor angle sensor 128 for detection of a rotating angle of the rotor 124a to control the electric motor 124 receives electricity from the 5V power circuit 134 of the monitoring function unit 130 to actuate, a valve position VP can be deduced on the basis of a motor rotating angle θm from the motor angle sensor 128 and transmitted to the main ECU 90 even when abnormality occurs in the 5V power circuit 114 of the operational function unit 110 and the shaft position sensor 122, which receives electricity from the 5V power circuit 114, does not function. Further, since the monitoring function unit 130 actuates receiving electricity from the 5V power circuit 134 being separate of the 5V power circuit 114 of the operational function unit 110, it can actuate even when abnormality occurs in the 5V power circuit 114 of the operational function unit 110.

With the transmission device according to the embodiment, while the operational function unit 110 and the monitoring function unit 130 monitor each other, the monitoring function unit 130 may monitor abnormality in the operational function unit 110 but the operational function unit 110 may not monitor abnormality in the monitoring function unit 130.

Figure 10:
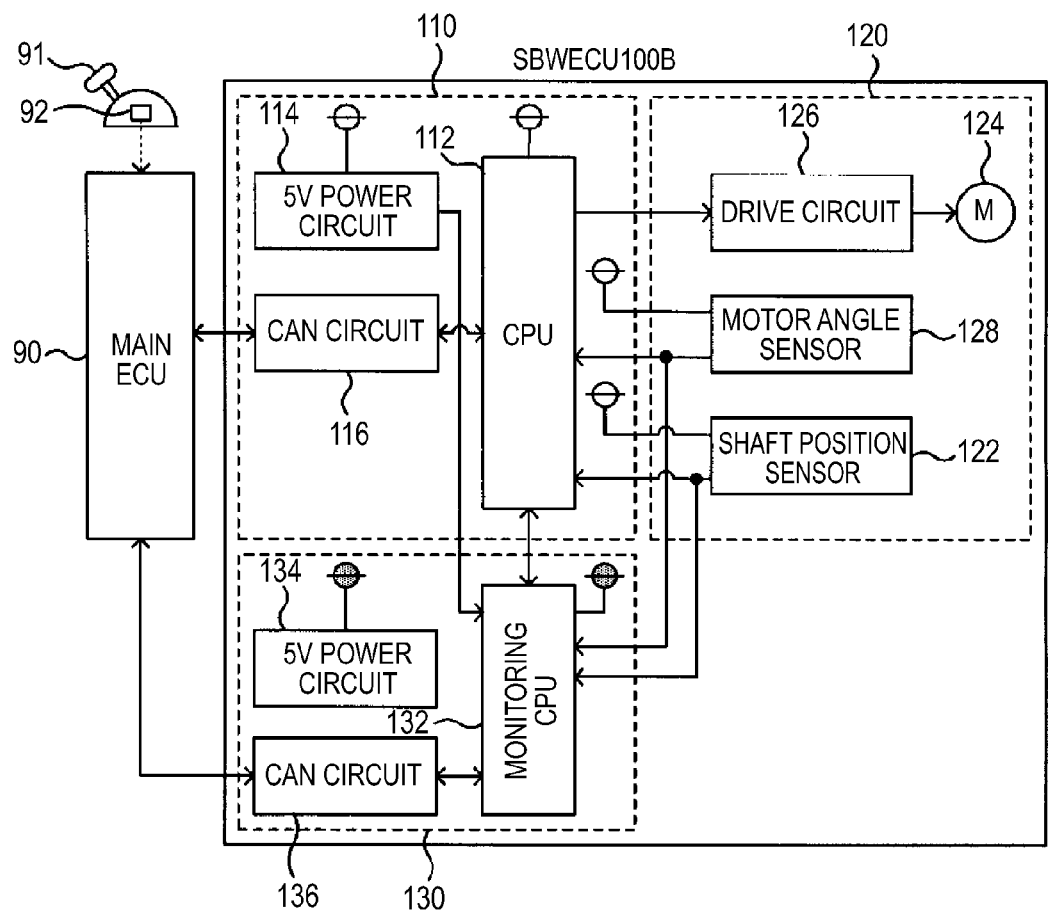
FIG. 10 is a configuration showing an outline of the construction of an SBWECU 100B of a modification.

With the transmission device according to the embodiment, while the motor angle sensor 128 actuates receiving electricity from the 5V power circuit 134 of the monitoring function unit 130, the motor angle sensor 128 may actuate receiving electricity from the 5V power circuit 114 of the operational function unit 110 as shown in an SBWECU 100B, which is shown in FIG. 10 and constitutes a modification. In this case, however, when abnormality occurs in the 5V power circuit 114 of the operational function unit 110, the monitoring function unit 130 cannot grasp a valve position VP.

Figure 11:
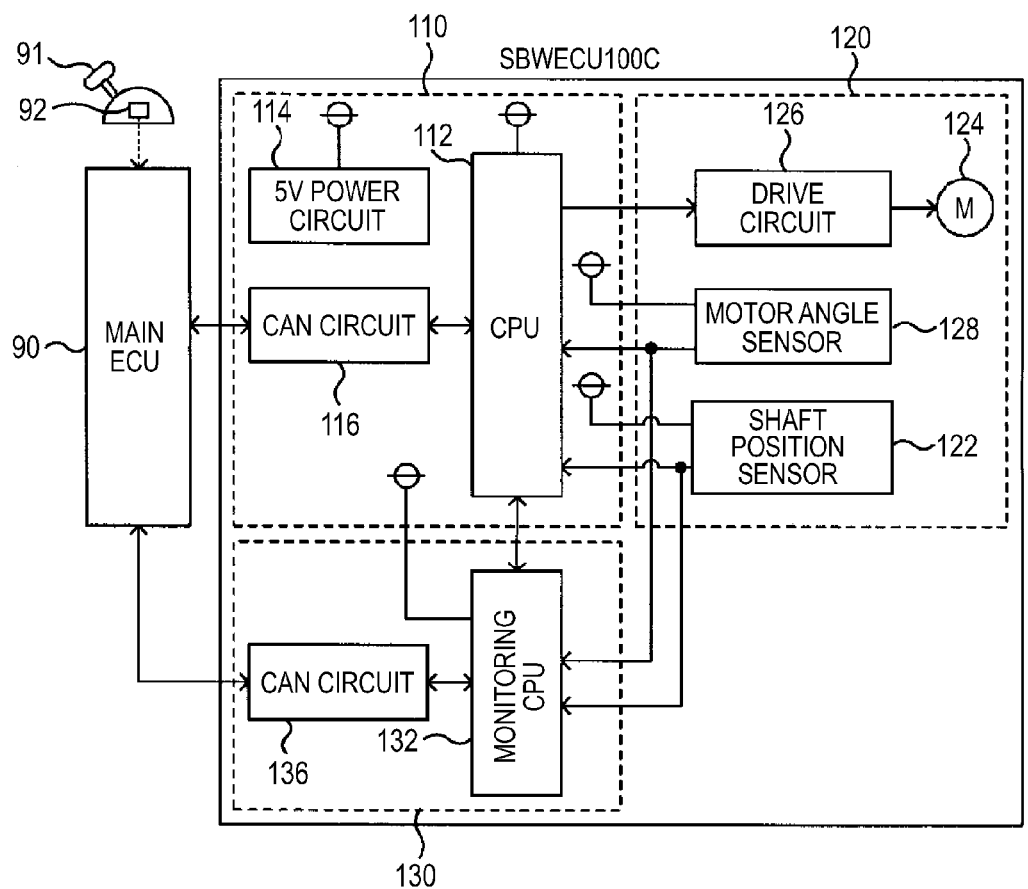
FIG. 11 is a configuration showing an outline of the construction of an SBWECU 100C of a modification.

With the transmission device according to the embodiment, while the monitoring function unit 130 actuates receiving electricity from the 5V power circuit 134 being separate of the 5V power circuit 114 of the operational function unit 110, the 5V power circuit 114 of the operational function unit 110 may be used in common as shown in an SBWECU 100C, which is shown in FIG. 11 and constitutes a modification. In this case, however, when abnormality occurs in the 5V power circuit 114, the monitoring function unit 130 stops functioning together with the operational function unit 110.

Figure 12:
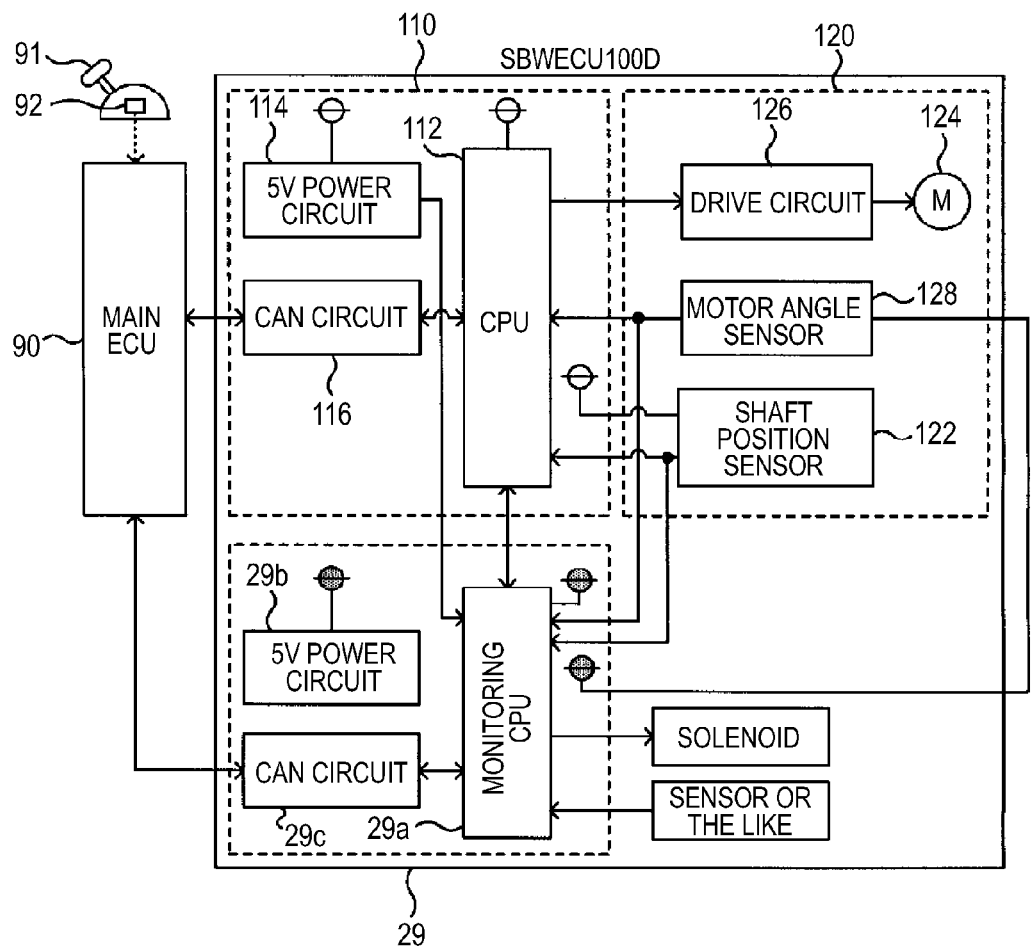
FIG. 12 is a configuration showing an outline of the construction of an SBWECU 100D of a modification.

With the transmission device according to the embodiment, while the monitoring function unit 130 is incorporated into the SBWECU 100, an SBWECU 100D being a modification shown in FIG. 12 may incorporate thereinto the operational function unit 110 and the actuator function unit 120 and an operational function unit comprising a CPU 29a, a 5V power circuit 29b, and a CAN circuit 29c may be incorporated into a further ECU such as ATECU 29, etc.

Figure 13:
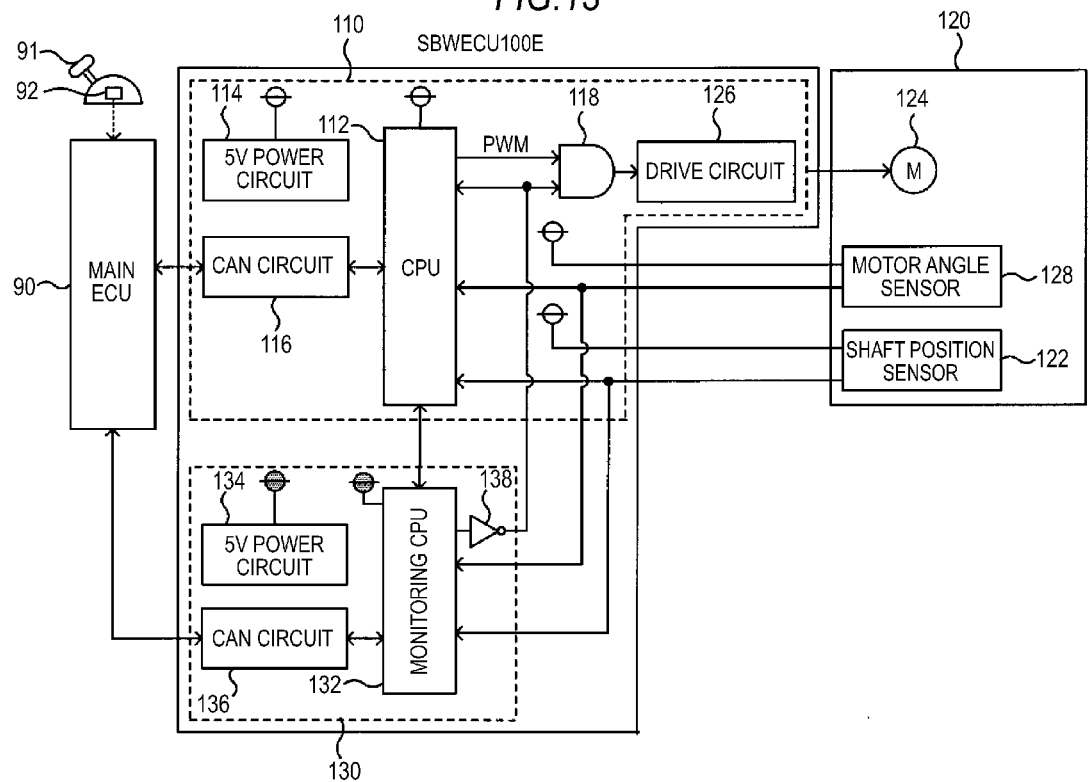
FIG. 13 is a configuration showing an outline of the construction of an SBWECU 100E of a modification.

With the transmission device according to the embodiment, while a drive signal (PWM signal) from the CPU 112 of the operational function unit 110 is output directly to the drive circuit 126 of the actuator function unit 120, a drive signal from the CPU 112 of the operational function unit 110 may be output to the drive circuit 126 through an AND circuit 118 as shown in an SBWECU 100E, which is shown in FIG. 13 and constitutes a modification. The AND circuit 118 is incorporated into the operational function unit 110 to input thereinto a signal output from the CPU 112 of the operational function unit 110 and a signal output from the monitoring CPU 132 of the monitoring function unit 130 through an inverting circuit 138 to output an OFF signal to the drive circuit 126 when either of the both signals is an OFF signal and to output an ON signal to the drive circuit 126 when the both signals are ON signals. Since a signal from the monitoring CPU 132 is input into the AND circuit 118 through the inverting circuit 138, a drive signal from the CPU 112 of the operational function unit 110 is transmitted to the drive circuit 126 when the monitoring CPU 132 outputs an OFF signal (enabling signal), and a drive signal from the CPU 112 of the operational function unit 110 is not transmitted to the drive circuit 126 when the monitoring CPU 132 outputs an ON signal (inhibiting signal). That is, control of driving of the motor 124 by the operational function unit 110 can be allowed or inhibited by a signal from the monitoring function unit 130. Also, an enabling signal output from the monitoring CPU 132 of the monitoring function unit 130 through the inverting circuit 138 is input into the CPU 112 of the operational function unit 110, thus enabling grasping the presence of allowance on the side of the monitoring function unit 130. In addition, with the modification, while the AND circuit 118 is incorporated into the operational function unit 110, it does not matter whether the AND circuit is incorporated into the actuator function unit 120. Subsequently, an explanation will be given to respective processings of an operational function unit side processing routine and a monitoring function unit side processing routine when the SBWECU 100E being a modification is used.

Figure 14:
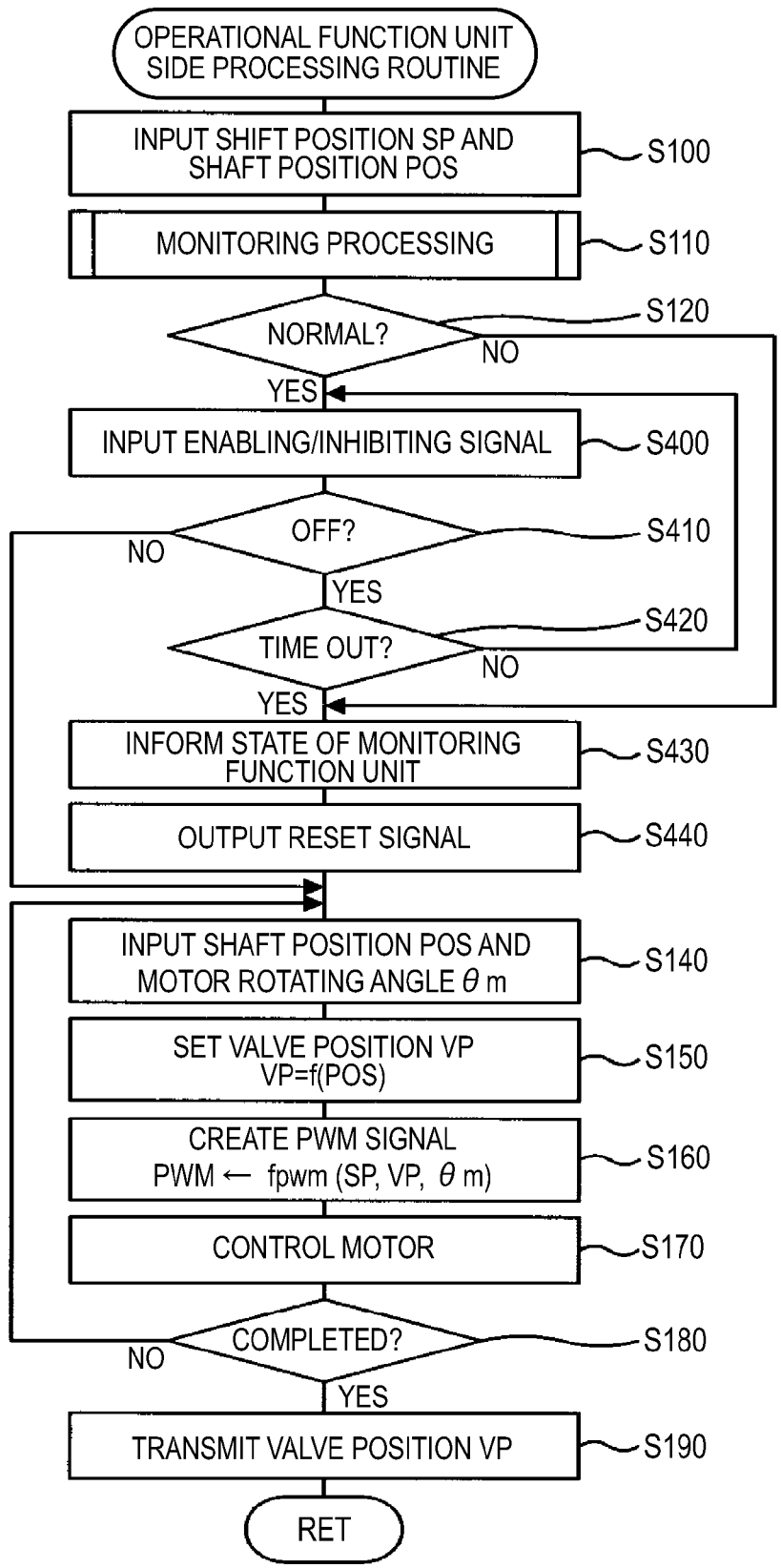
FIG. 14 is a flowchart illustrating an operational function unit side processing routine of a modification.

FIG. 14 is a flowchart illustrating an operational function unit side processing routine of the modification. The same processing of the operational function unit side processing routine of the modification as that of the operational function unit side processing routine of the embodiment is denoted by the same STEP number and an explanation therefor is omitted because of duplication. In the operational function unit side processing routine of the modification, when it is determined in STEP S120 that the monitoring function unit 130 (the monitoring CPU 132, the 5V power circuit 134, and the CAN circuit 136) is not normal, that is, abnormal, the main ECU 90 is informed of the state (abnormal location, etc.) of abnormality in the monitoring function unit 130 (STEP S430), a reset signal for resetting of the monitoring function unit 130 is output (STEP S440), and the processings in and after STEP S140 are executed. When abnormality occurs in the monitoring function unit 130, the monitoring CPU 132 of the monitoring function unit 130 is reset to output an OFF signal and the inverting circuit 138 inputs an ON signal into the AND circuit 118, so that the operational function unit 110 can separate monitoring by the monitoring function unit 130 to output a drive signal to the drive circuit 126 to drivingly control the motor 124. On the other hand, when it is determined in STEP S120 that abnormality does not occur in the monitoring function unit 130, an enabling/inhibiting signal from the monitoring function unit 130 is input (STEP S400) and it is determined whether the enabling/inhibiting signal thus input is an OFF signal, that is, driving of the motor 124 is inhibited by the monitoring function unit 130 (STEP S410). When the enabling/inhibiting signal thus input is not an OFF signal, that is, driving of the motor 124 is permitted by the monitoring function unit 130, the processings in and after STEP S140 are executed as they are, when the enabling/inhibiting signal thus input is an OFF signal, that is, driving of the motor 124 is inhibited by the monitoring function unit 130, the routine returns to STEP S400, until a predetermined time-out time (for example, 1 second) has elapsed, to wait until the enabling/inhibiting signal becomes an ON signal (STEP S420), when the time-out time has elapsed, the main ECU 90 is informed to that effect (STEP S430), a reset signal for resetting of the monitoring function unit 130 is output (STEP S440), and the processings in and after STEP S140 are executed. The processings in STEP S410 to STEP S440 reset the monitoring function unit 130 to enable drivingly controlling the motor 124 when some abnormality, which cannot be grasped by the operational function unit 110, occurs in the monitoring function unit 130.

Figure 15:
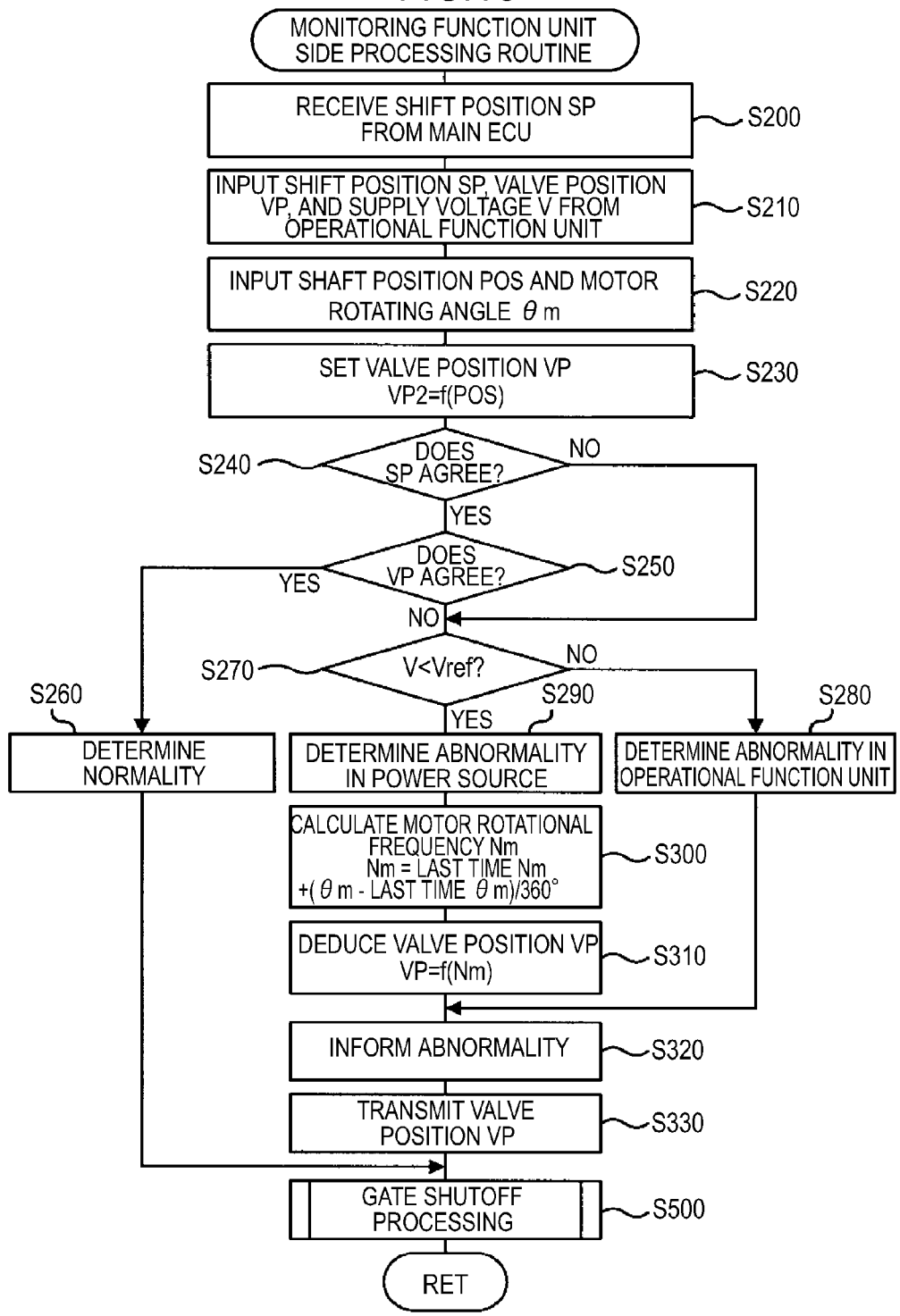
FIG. 15 is a flowchart illustrating a monitoring function unit side processing routine of a modification.
Figure 16:
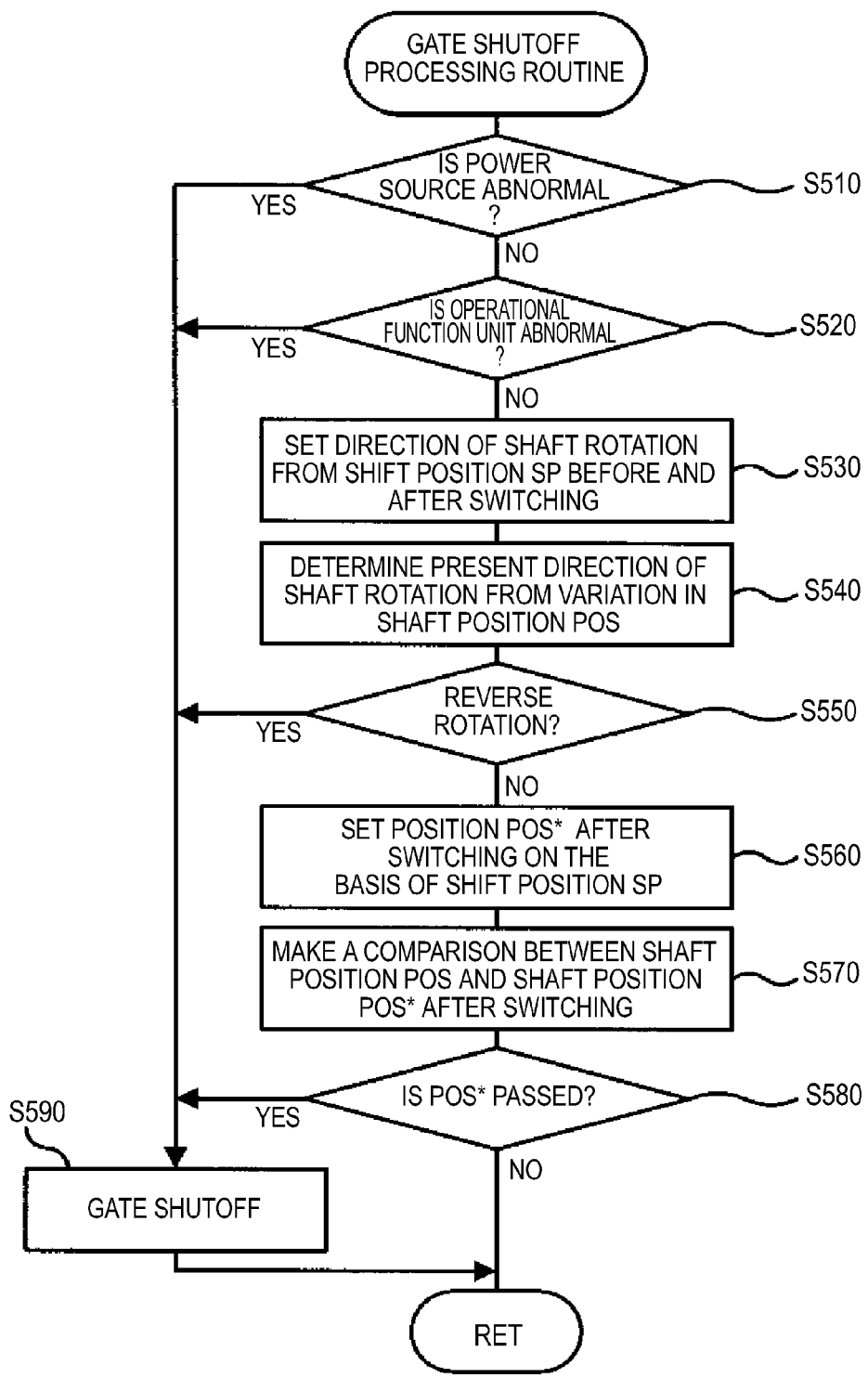
FIG. 16 is a flowchart illustrating an example of a gate shutoff processing routine.
Figure 17A:
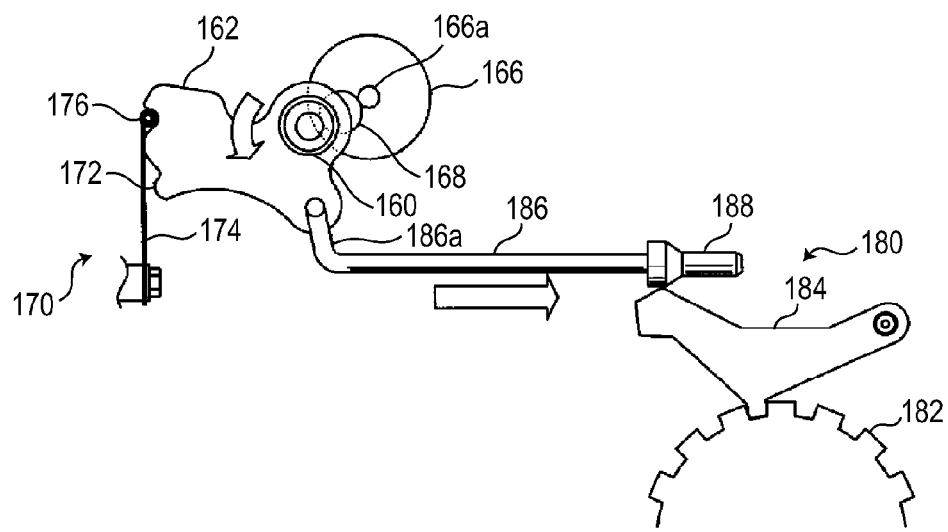
FIGS. 17A and 17B are a configuration showing an outline of the construction of a driving system of a parking lock mechanism 180.
Figure 17B:
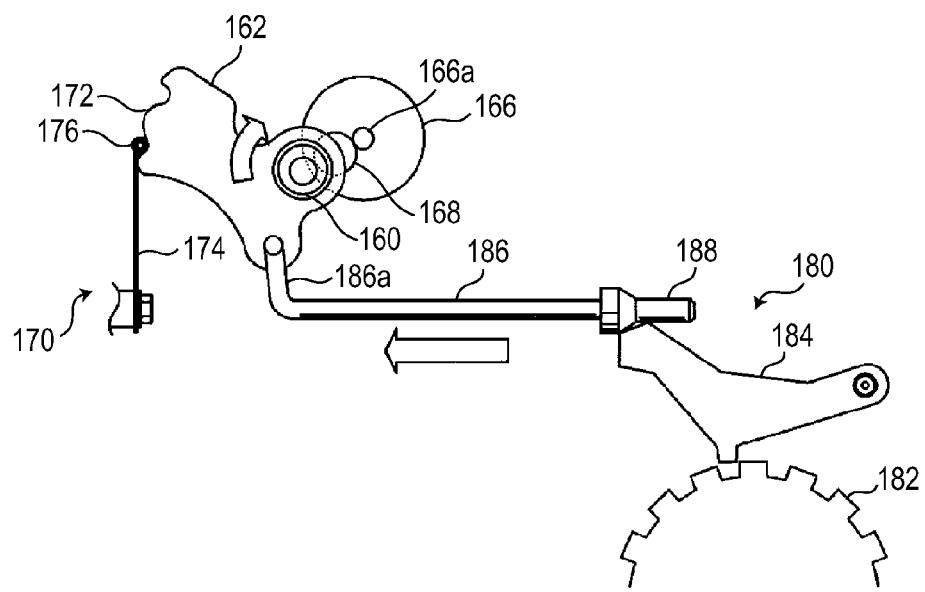

FIG. 15 is a flowchart illustrating a monitoring function unit side processing routine of the modification. As shown in the figure, a gate shutoff processing in STEP S500 is added after STEP S260 and STEP S330 in the monitoring function unit side processing routine of the embodiment. In addition, when the monitoring function unit 130 is reset to an initial state, an OFF signal is output. FIG. 16 is a flowchart illustrating an example of a gate shutoff processing routine. In the gate shutoff processing, when abnormality occurs in either of the 5V power circuit 114 of the operational function unit 110, the CPU 112 of the operational function unit 110, and the CAN circuit 116 (STEP S510, STEP S520), transmission of a drive signal to the drive circuit 126 from the CPU 112 of the operational function unit 110 is shut off (gate shutoff) (STEP S590). In the embodiment, the gate shutoff is performed by outputting an ON signal since the monitoring CPU 132 is connected to the AND circuit 118 through the inverting circuit 138. When abnormality does not occur in either of the 5V power circuit 114 of the operational function unit 110, the CPU 112 of the operational function unit 110, and the CAN circuit 116, a direction of rotation, in which a manual shaft 160 should be rotated, is set by a shift position SP before and after switching of the shift lever 91 (STEP S530), a direction, in which the manual shaft 160 is presently rotated, is determined according to variation, in the shaft position POS, input from the shaft position sensor 122 (STEP S540), and it is determined whether the direction of rotation as set is reverse to the direction of rotation as determined (STEP S550). When it is determined that the direction of rotation as set is reverse to the direction of rotation as determined, the gate shutoff described above is performed (STEP S590), when it is determined that the both directions are the same, an after-switch position POS* being a position of the manual shaft 160 to correspond to a shift position SP is set (STEP S560), and a comparison is made between a present shaft position POS and the after-switch position POS* whereby it is determined whether the rotation of the manual shaft 160 passes (goes across) the after-switch position POS* (STEP S570). Hereupon, an after-switch position POS* is set by beforehand finding the relationship between a shift position SP and an after-switch position POS* to store the same as map in the ROM and deducing a corresponding after-switch position POS* when a shift position SP is given. In the embodiment, the after-switch position POS* is defined as a region of a predetermined width about a rotating angle, which the manual shaft 160 should assume relative to a shift position SP. When it is determined that the rotation of the manual shaft 160 passes the after-switch position POS*, the gate shutoff described above is performed (STEP S590) to terminate the routine, and when it is determined that the rotation of the manual shaft does not pass the after-switch position POS*, nothing is performed and the routine is terminated. As described above, since the gate shutoff is performed by outputting an ON signal from the monitoring CPU 132, gate permission is given when an ON signal is not output, that is, an OFF signal is output.

In addition, with the transmission device according to the embodiment, while the SBWECU 100 is formed by incorporating the drive circuit 126 into the actuator function unit 120, the drive circuit 126 may be incorporated into the operational function unit 110 as shown in FIG. 13.

With the transmission device according to the embodiment, while the electric motor 124 actuates the manual valve 58 keeping with a shift operation, this is not limitative but an electric motor 166 may actuate a parking lock mechanism 180 keeping with a shift operation as shown in FIG. 16. The parking lock mechanism 180 comprises a parking gear 182 mounted to the gear mechanism 26 of the automatic transmission 20, a parking pawl 184 that meshes with the parking gear 182 to lock the same in a state of stopping its rotation, a parking rod 186, and a parking cam 188 provided at a tip end of the parking rod 186 to push the parking pawl 184 toward the parking gear 182 and release such push upon sliding of the parking rod 186. The parking rod 186 is formed at a base end thereof with an L-shaped hook 186a, the hook 186a being caught in a hole formed on a manual plate 162 to be positioned eccentrically to an axis of rotation of the manual shaft 160. Accordingly, the electric motor 166 rotates the manual shaft 160 forward to enabling locking the parking gear 182 (see FIG. 16(a)) and rotates the manual shaft 160 backward to enabling releasing locking of the parking gear 182 (see FIG. 16(b)). In addition, provided on the manual plate 162 in the same manner as in the embodiment is a detent mechanism 170 comprising a detent spring 174 and a roller 176 brought into pressure contact with a cam surface 172 formed at an end of the manual plate 162.

Assuming a hybrid automobile mounting thereon an engine, a first motor, a planetary gear mechanism having three rotating elements, to which a crankshaft of the engine, a rotating shaft of a motor MG1, and a driving shaft connected to an axle shaft are connected respectively, and a second motor connected to the driving shaft, traveling can be performed by freely changing power from the engine in speed to output the same to the driving shaft without the provision of any hydraulic circuit, so that a shift-by-wire system, which actuates the parking lock mechanism 180 when a shift lever is operated to a P (parking) position and which releases the actuation of the parking lock mechanism 180 when the shift lever is operated to a position (for example, a D (drive) position and a neutral (N) position) except the P position, is conceivable. With the shift-by-wire system, since it suffices to only switch a position of the manual plate 162 between two positions, it is unnecessary to mount a shaft position sensor to the manual shaft 160 provided that the electric motor 166 is driven in a manner to push the roller 176 against a wall provided at an end of movement of the cam surface 172 of the detent mechanism 170, but since a change in position involves a mechanical impact, it is necessary in view of durability to make the manual plate 162 large in size, such as in thickness in order to achieve an increase in strength, which is unfavorable in terms of mounting on a vehicle being difficult to ensure a space. Also, when the CPU 102 of the SBWECU 100 gets out of order, the position of the manual shaft 160 is made indefinite, so that the ATECU 29 cannot but make all the clutches OFF to define a neutral (N) position and so withdrawal traveling cannot be performed. In a modification, a shaft position sensor 122 is mounted to the manual shaft 160 in order to avoid such disadvantage. Accordingly, the same processing as that in the embodiment can be applied in the modification.

With the transmission device according to the embodiment, while the automatic transmission 20 comprises a stepped automatic transmission of six-speed gear change of forward travel 1-speed to 6-speed, this is not limitative but it may comprise a stepped automatic transmission of two-speed to five-speed gear change and may comprise a stepped automatic transmission of at least seven-speed gear change.

With the transmission device according to the embodiment, the main ECU 90 and the ATECU 29 comprise two electronic control units but may comprise three or more electronic control units and it does not matter whether they may comprise a single electronic control unit.

While the transmission device according to the embodiment is applied to an automobile 10 mounting thereon an engine 12 as an internal combustion engine, it may be applied to a hybrid automobile comprising an internal combustion engine and an electric motor. Also, the transmission device may be applied to an electric automobile mounting thereon only an electric motor for traveling.

While application of the invention to a transmission device has been described in the embodiment, a configuration of a shift-by-wire device will do.

Hereupon, an explanation will be given to correspondence between main elements in the embodiment and main elements of the invention described in DISCLOSURE OF THE INVENTION. In the embodiment, the shaft position sensor 122 corresponds to "shaft position sensor", the drive circuit 126 corresponds to "drive unit", the main ECU 90 corresponds to "administrative electronic control unit", the operational function unit 110 of the SBWECU 100, which executes the operational function unit side processing routine in FIG. 7, corresponds to "operational function unit", and the monitoring function unit 130 of the SBWECU 100, which executes the monitoring function unit side processing routine in FIG. 9, corresponds to "monitoring function unit". Also, the electric motor 124 corresponds to "electromotor" and the motor angle sensor 128 corresponds to "rotational position sensor". Also, "signal transmission cutoff circuit" corresponds to the AND circuit 118. Hereupon, "electromotor" is not limited to a brushless motor but may be any type of electromotor, such as synchronous motors such as DC brushless motor, SR motor (switched reluctance motor), etc., which detects a rotational position of a rotating shaft and makes use of the detected rotational position to exercise control. Also, "rotational position sensor" is not limited to one making use of a hall IC but may be a sensor of a further type such as optical rotary encoder, resolver, or the like. In addition, correspondence between main elements in the embodiment and main elements of the invention described in "SUMMARY OF THE INVENTION" does not limit elements of the invention described in "SUMMARY OF THE INVENTION" since the embodiment is an example of a specific explanation of "DETAILED DESCRIPTION OF THE EMBODIMENTS" described in "SUMMARY OF THE INVENTION". That is, the invention described in "SUMMARY OF THE INVENTION" should be interpreted on the basis of the description therein and the embodiment is only a specific example of the invention described in "SUMMARY OF THE INVENTION".

While the best mode for carrying out the invention has been described using the embodiment, the invention is not limited to such embodiment but can be of course carried out in various configurations within a scope not departing from the gist of the invention.

The invention is applicable to the automobile industry.

What is claimed is:

1. A shift-by-wire device connected communicatively to an administrative electronic control unit, which inputs thereinto a signal from a shift position sensor for detection of a demanded shift position demanded by a driver, to drivingly control a manual shaft on the basis of a shift command from the administrative electronic control unit to actuate an object being actuated, the shift-by-wire device comprising:
   a shaft position sensor that detects a rotating angle of the manual shaft,
   a drive unit that drives an actuator of the manual shaft,
   an operational function unit including an operational CPU, the operational CPU inputs the rotating angle of the shaft from the shaft position sensor into the operational function unit, receives a shift command from the administrative electronic control unit, transmits the rotating angle of the shaft to the administrative electronic control unit, and controls the drive unit on the basis of the rotating angle of the shaft thus input and the shift command thus received, and
   a monitoring function unit including a monitoring CPU, the monitoring CPU inputs the rotating angle of the shaft from the shaft position sensor into the monitoring function unit, monitors the presence of abnormality in the operational function unit and transmits the rotating angle of the shaft to the administrative electronic control unit when it is determined that abnormality occurs in the operational function unit,
   wherein:
   the actuator of the manual shaft comprises an electric motor having a rotor,
   a rotational position sensor is provided to detect a rotational position of the rotor in order to control the electric motor,
   the operational function unit inputs thereinto the rotational position of the rotor from the rotational position sensor and controls the drive unit on the basis of the rotational position, and
   when it is determined that abnormality occurs in the electric source for supplying electricity to the operational function unit, the monitoring function unit inputs thereinto a rotational position of the rotor from the rotational position sensor and deduces a rotating angle of the shaft on the basis of the rotational position to transmit the rotating angle to the administrative electronic control unit.

2. The shift-by-wire device according to claim 1, wherein the monitoring function unit monitors communicative abnormality between the operational function unit and the administrative electronic control unit.

3. The shift-by-wire device according to claim 1, wherein the operational function unit and the monitoring function unit are actuated by using different electric sources, and
   the monitoring function unit monitors the presence of abnormality in that electric source, from which electricity is supplied to the operational function unit.

4. The shift-by-wire device according to claim 3, wherein the actuator of the manual shaft comprises:
   the shaft position sensor comprises a sensor that receives electricity from the electric source for the operational CPU to actuate,
   the rotational position sensor comprises a sensor that receives electricity from the electric source for the monitoring CPU to actuate.

5. The shift-by-wire device according to claim 1, wherein the monitoring function unit is one, by which when monitoring determines abnormality, results of the determination is transmitted to the administrative electronic control unit.

6. The shift-by-wire device according to claim 1, wherein the monitoring function unit enables and inhibits transmission of a drive signal to the drive unit from the operational function unit.

7. The shift-by-wire device according to claim 6, wherein the monitoring function unit enables transmission of a drive signal to the drive unit when it is determined that abnormality does not occur in the operational function unit, and inhibits transmission of a drive signal to the drive unit when it is determined that abnormality occurs in the operational function unit.

8. The shift-by-wire device according to claim 7, wherein the monitoring function unit inputs thereinto a shift command from the administrative electronic control unit to inhibit transmission of a drive signal to the drive unit when a direction of rotation of the manual shaft is different from a direction of rotation conformed to the shift command thus input when the actuator drives the manual shaft.

9. The shift-by-wire device according to claim 7, wherein the monitoring function unit inputs thereinto a shift command from the administrative electronic control unit to inhibit transmission of a drive signal to the drive unit when a rotating angle of the manual shaft exceeds the rotating angle conformed to the shift command thus input when the actuator drives the manual shaft.

10. The shift-by-wire device according to claim 6, further comprising a signal transmission cutoff circuit that transmits a drive signal to the drive unit when an enabling signal is input from the monitoring function unit, and shuts off transmission of a drive signal to the drive unit when the enabling signal is not input, and
   wherein the monitoring function unit outputs an OFF signal as the enabling signal through an inverting circuit, and
   the operational function unit determines whether a predetermined abnormality occurs in the monitoring function unit, and resets the monitoring function unit when it is determined that the predetermined abnormality occurs in the monitoring function unit.

11. The shift-by-wire device according to claim 10, wherein the operational function unit resets the monitoring function unit when an enabling signal is not output from the monitoring function unit over a predetermined period of time in the case where it is not determined that the predetermined abnormality occurs in the monitoring function unit.

12. The shift-by-wire device according to claim 1, wherein the drive unit, the operational function unit, and the monitoring function unit comprise a single electronic control unit.

13. The shift-by-wire device according to claim 1, wherein the object being actuated comprises a parking lock mechanism that actuates as the manual shaft is driven.

14. A shift-by wire system comprising:
   a transmission device mounting thereon an automatic transmission capable of power transmission by a clutch that makes use of fluid pressure supplied through a manual valve interlocking with a manual shaft to actuate, and
   a shift by wire device connected communicatively to an administrative electronic control unit, which inputs thereinto a signal from a shaft position sensor for detection of a demanded shift position demanded by a driver, to drivingly control the manual shaft on the basis of a shift control command from the administrative electronic control unit to actuate an object being actuated, the shift-by-wire device comprising:
   a shaft position sensor that detects a rotating angle of the manual shaft,
   a drive unit that drives an actuator of the manual shaft,
   an operational function unit including an operational CPU, the operational CPU inputs the rotating angle of the shaft from the shaft position sensor into the operational function unit, receives a shift command from the administrative electronic control unit, transmits the rotating angle of the shaft to the administrative electronic control unit, and controls the drive unit on the basis of the rotating angle of the shaft thus input and the shift command thus received, and
   a monitoring function unit including a monitoring CPU, the monitoring CPU inputs the rotating angle of the shaft from the shaft position sensor into the monitoring function unit, monitors the presence of abnormality in the operational function unit and transmits the rotating angle of the shaft to the administrative electronic control unit when it is determined that abnormality occurs in the operational function unit,
   wherein:
   the actuator of the manual shaft comprises an electric motor having a rotor,
   a rotational position sensor is provided to detect a rotational position of the rotor in order to control the electric motor,
   the operational function unit inputs thereinto the rotational position of the rotor from the rotational position sensor and controls the drive unit on the basis of the rotational position,
   when it is determined that abnormality occurs in the electric source for supplying electricity to the operational function unit, the monitoring function unit inputs thereinto a rotational position of the rotor from the rotational position sensor and deduces a rotating angle of the shaft on the basis of the rotational position to transmit the rotating angle to the administrative electronic control unit, and
   the shift by wire device drives the manual shaft and the object being actuated.

* * * * *